US008670034B2

(12) United States Patent
Hattori et al.

(10) Patent No.: US 8,670,034 B2
(45) Date of Patent: Mar. 11, 2014

(54) IMAGE PROCESSOR AND CAMERA

(75) Inventors: Kazushige Hattori, Kariya (JP);
Toshihiro Hattori, Okazaki (JP);
Bingchen Wang, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1212 days.

(21) Appl. No.: 12/222,560

(22) Filed: Aug. 12, 2008

(65) Prior Publication Data

US 2009/0059005 A1    Mar. 5, 2009

(30) Foreign Application Priority Data

Aug. 28, 2007  (JP) .................................. 2007-221188

(51) Int. Cl.
*H04N 7/18* (2006.01)
(52) U.S. Cl.
USPC ............ 348/148; 345/620; 345/626; 382/283
(58) Field of Classification Search
USPC .................... 348/148; 345/626, 620; 382/283
See application file for complete search history.

(56) References Cited

U.S. PATENT DOCUMENTS

| | | | | |
|---|---|---|---|---|
| 6,476,855 | B1 * | 11/2002 | Yamamoto | 348/148 |
| 7,253,833 | B2 * | 8/2007 | Imoto | 348/148 |
| 7,505,047 | B2 * | 3/2009 | Yoshimura | 345/620 |
| 7,605,856 | B2 * | 10/2009 | Imoto | 348/335 |
| 7,697,055 | B2 * | 4/2010 | Imoto et al. | 348/335 |
| 7,986,371 | B2 * | 7/2011 | Suzuki et al. | 348/523 |
| 8,111,287 | B2 * | 2/2012 | Okamoto et al. | 348/118 |
| 8,115,810 | B2 * | 2/2012 | Yoneji | 348/148 |
| 8,139,083 | B2 * | 3/2012 | de Leon | 345/619 |
| 2002/0093514 | A1 * | 7/2002 | Edwards et al. | 345/626 |
| 2002/0175832 | A1 * | 11/2002 | Mizusawa et al. | 340/932.2 |
| 2003/0095182 | A1 * | 5/2003 | Imoto | 348/148 |
| 2003/0179293 | A1 * | 9/2003 | Oizumi | 348/148 |
| 2004/0021643 | A1 * | 2/2004 | Hoshino et al. | 345/173 |
| 2005/0083405 | A1 * | 4/2005 | Imoto et al. | 348/148 |
| 2005/0083427 | A1 * | 4/2005 | Imoto | 348/335 |
| 2005/0264833 | A1 * | 12/2005 | Hiraoka et al. | 358/1.9 |

(Continued)

FOREIGN PATENT DOCUMENTS

| | | |
|---|---|---|
| JP | A-6-178197 | 6/1994 |
| JP | A-2004-173071 | 6/2004 |

(Continued)

OTHER PUBLICATIONS www.math-prof.com; Geometry: Properties of a Rhombus, dated Jun. 17, 2007 as retrieved from Archive.org, Internet, pp. 1-6.*

(Continued)

*Primary Examiner* — Oleg Survillo
(74) *Attorney, Agent, or Firm* — Posz Law Group, PLC

(57) ABSTRACT

An image processor outputs an image containing relatively much information of a central area in the horizontal direction. A mask composed of an upper mask and a lower mask is superimposed on the image. The upper mask is concave on the lower side thereof and disposed along the upper side of the image. The lower mask is concave on the upper side thereof and disposed along the lower side of the image. When the image is masked with this mask, the peripheral portion of the image that is prone to be distorted becomes invisible. Therefore, discomfort a user feels because of distortion can be reduced. In addition, the user can view the image with the much information of the central area of the image in the horizontal direction.

36 Claims, 20 Drawing Sheets

(56) References Cited

U.S. PATENT DOCUMENTS

| | | |
|---|---|---|
| 2006/0187238 A1 | 8/2006 | Yoneji |
| 2006/0228091 A1* | 10/2006 | Lee ............................ 385/147 |
| 2007/0008091 A1* | 1/2007 | Takenaga et al. ............ 340/435 |
| 2007/0026904 A1* | 2/2007 | Matsuda .................... 455/569.2 |
| 2007/0182759 A1* | 8/2007 | Tokumaru .................... 345/619 |
| 2007/0188795 A1* | 8/2007 | Chishima et al. ............ 358/1.15 |
| 2008/0143740 A1* | 6/2008 | Wilensky et al. ............ 345/619 |
| 2008/0266321 A1* | 10/2008 | Aufranc et al. ............... 345/626 |
| 2009/0059006 A1* | 3/2009 | Hattori et al. ................ 348/148 |
| 2009/0304276 A1* | 12/2009 | Noh ............................ 382/167 |
| 2010/0265104 A1* | 10/2010 | Zlojutro ........................ 340/990 |

FOREIGN PATENT DOCUMENTS

| | | |
|---|---|---|
| JP | A-2005-112267 | 4/2005 |
| JP | A-2007-66224 | 3/2007 |
| JP | A-2008-4990 | 1/2008 |

OTHER PUBLICATIONS www.mathsisfun.com, Angles, dated Jul. 13, 2007 as retrieved from Archive.org, Internet, pp. 1-2.*
Notice of Reason for Refusal mailed on Nov. 10, 2009 issued from the Japanese Patent Office in the corresponding Japanese patent application No. 2007-221188 (and English translation).

* cited by examiner

FIG. 6

```
// HEAD PORTION
MaskID          = A1;    // Mask ID
MaskColorR      = 20;    // Mask R VALUE
MaskColorG      = 0;     // Mask G VALUE
MaskColorB      = 255;   // Mask B VALUE
MaskLuminance   = 128;   // Mask LUMINANCE // DATA PORTION
-1    -1    -1    -1    -1   ···   -1
-1    -1    -1     1     1   ···   -1
-1     1     1     1     1   ···   -1
 1     1     1     1     1   ···    1
 :     :     :     :     :          :
-1    -1    -1    -1    -1   ···   -1
```

350

IMAGE PROCESSOR AND CAMERA

CROSS REFERENCE TO RELATED APPLICATION

This application is based on and incorporates herein by reference Japanese Patent Application No. 2007-221188 filed on Aug. 28, 2007.

FIELD OF THE INVENTION

The present invention relates to an image processor for processing images picked up by a camera mounted in a vehicle and a camera mounted in a vehicle.

BACKGROUND OF THE INVENTION

In recent years, there have been developed techniques to display an image, picked up by a camera mounted in a vehicle, on a monitor installed in proximity to the driver's seat. With these techniques, drivers can recognize any obstacle or the like present at the drivers' blind spot. However, it is difficult to display an image easily viewable to drivers because of the characteristics of a camera or the position of installation of a camera. For this reason, drivers used to often feel discomfort.

As a technique to solve this problem, for example, a vehicle surroundings monitoring device is disclosed in Patent Document 1. This vehicle surroundings monitoring device makes an image picked up by a camera easily viewable to a driver by taking the following measure: when the image is displayed, an upper mask positioned at the upper part of a screen and a lower mask positioned at the lower part of the screen are combined with the image. The upper mask cited here is a mask composed of an upper side mask area that is disposed along the upper side of the screen and convex downward and a central mask area extended upward from the central part of the screen. The lower mask is a mask formed in the shape of an arc gently convex upward along the lower side of the screen.

With the vehicle surroundings monitoring device disclosed in Patent Document 1, as a result, an image can be displayed so that it is narrower as it goes to the central area in the horizontal direction and is wider as it goes to either end. That is, a panoramic image can be displayed.

Patent Document 1: JP-A-2006-262447 (corresponding to US2006/0187238)

On the other hand, images displayed by the vehicle surroundings monitoring device disclosed in Patent Document 1 involves a drawback that the information of the central area in the horizontal direction is reduced. Therefore, it is difficult to apply the invention disclosed in Patent Document 1 to images in which the information of the central area in the horizontal direction is especially important to a driver (for example, rear view images used when a vehicle is reversed).

SUMMARY OF THE INVENTION

The invention has been made in consideration of the above problems. It is an object of the present invention to provide an image processor and the like capable of outputting images containing the relatively much information of the central area in the horizontal direction with which drivers are less prone to feel discomfort.

As an example of the present invention, an image processor is provided as follows. An image inputting means is included for inputting as an image signal an image of an area adjacent to a vehicle from a camera provided for the vehicle. A mask information storing means is included for storing mask information, which is information on a mask. A mask processing executing means is included for carrying out mask processing on the image inputted by the image inputting means based on the mask information stored in the mask information storing means. An outputting means is included for outputting an image subjected to mask processing by the mask processing executing means to a display device. Herein, a shape of the image outputted to the display device by the outputting means is substantially rectangular; and a mask represented by the mask information stored in the mask information storing means includes an upper mask and a lower mask. The upper mask is concave on a lower side thereof and is disposed along an upper side of the image when the image is displayed in the display device; the lower mask is concave on an upper side thereof and is disposed along a lower side of the image when the image is displayed in the display device.

As another example of the present invention, a camera is provided for picking up an image of an area adjacent to a vehicle and outputting a substantially rectangular image. The camera has a lens portion, which includes an upper mask member and a lower mask member. The upper mask member implements a mask that masks an upper part of the image when the image is displayed in a display device; the upper mask member is concave on a lower side thereof. The lower mask member implements a mask that masks a lower part of the image when the image is displayed in the display device; the lower mask member is concave on an upper side thereof.

BRIEF DESCRIPTION OF THE DRAWINGS

The above and other objects, features, and advantages of the present invention will become more apparent from the following detailed description made with reference to the accompanying drawings. In the drawings:

FIG. 6 is an explanatory drawing illustrating mask information;

DETAILED DESCRIPTION OF THE PREFERRED EMBODIMENTS

Hereafter, description will be given to embodiments in which the invention is applied with reference to the drawings. The embodiments of the present invention are not limited to those described below, and the invention can be variously embodied without departing from the technical scope of the invention.

<Description of Configuration>

Figure 1:
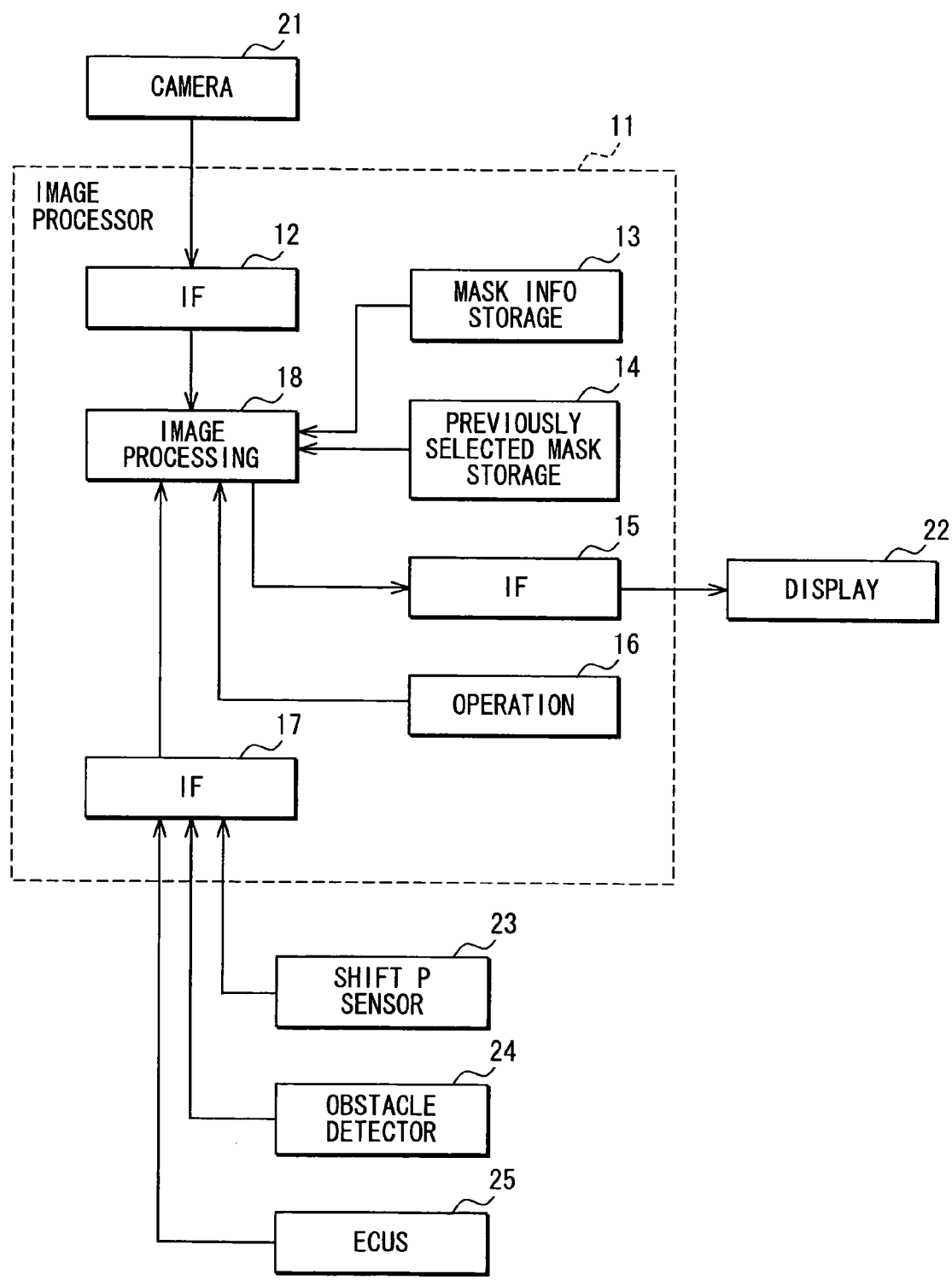
FIG. 1 is a block diagram illustrating an image processor and its peripheral devices according to an embodiment of the present invention.

FIG. 1 is a block diagram illustrating an image processor 11, which is mounted in a vehicle, according to an embodiment and various devices connected to the image processor 11. The image processor 11 is connected with a camera 21, a display device 22, a shift position sensor 23, an obstacle detector 24, and an ECU (Electronic Control Unit) group 25.

(1) Image Processor 11

The image processor 11 includes an image input interface 12, a mask information storage unit 13, a previously selected mask storage unit 14, an image output interface 15, an operation unit 16, an information input interface 17, and an image processing unit 18.

The image input interface 12 is used to input an image signal from the camera 21.

The mask information storage unit 13 stores mask information related to multiple masks. The mask information is required to configure a mask and is composed of information related to the shape of each mask, information related to the color of each mask, and the like. Each piece of mask information is provided with identification information (ID) with which the information can be uniquely identified. A concrete example of mask information will be described later.

The previously selected mask storage unit 14 stores identification information (ID) with which the mask information related to the previously used mask can be identified.

The image output interface 15 is used to output an image signal to the display device 22.

The operation unit 16 is composed of: a touch panel integrated with the display surface of the display device 22 by lamination; a mechanical switch provided in the periphery of the display device 22; a steering wheel switch provided on the steering wheel; and the like. Users can use this device, or the operation unit, to input an operation command to the image processor 11.

The information input interface 17 is used to input various signals from the shift position sensor 23, obstacle detector 24, and ECU group 25.

The image processing unit 18 is constructed of a publicly known microcomputer and has a function of controlling the above-mentioned components based on a program stored in ROM, flash memory, or the like to execute varied processing.

(2) Camera 21

This camera 21 for vehicles is installed at a rear part of the vehicle and is capable of picking up or capturing an image of the area adjacent to the vehicle. It is desirable that the camera should be a wide angle camera having a horizontal angle of view of 180 degrees or so. The camera may be constructed of multiple cameras so that images from these cameras are synthesized when used. An image picked up by the camera 21 is transmitted as an image signal to the image processor 11 by wire. The image signal may be wirelessly transmitted by a publicly known radio system.

(3) Display Device 22

The display device 22 includes a color image display portion constructed of a liquid crystal panel or the like and displays images according to an image signal inputted from the image processor 11 by wire. In the display surface of the color image display portion, there is laminated and integrated a touch panel forming part of the operation unit 16. (The touch panel is not shown in the drawing.)

(4) Shift Position Sensor 23

This sensor is provided in a transmission, not shown, and has a function of detecting the shift position of the transmission. It can be learned from a signal obtained from the shift position sensor 23 whether the present shift potion is D (Drive), N (Neutral), or R (Reverse). The shift position sensor 23 is so constructed that it can transmit this signal to the image processor 11 by wire. The signal may be wirelessly transmitted by a publicly known radio system.

(5) Obstacle Detector 24

The obstacle detector 24 is capable of detecting any obstacle present in proximity to the vehicle using sonar, a radar, or the like. It also has a function of computing the distance to a detected obstacle. The obstacle detector 24 is so constructed that it can transmit the result of obstacle detection and information about the distance to a detected obstacle as obstacle information to the image processor 11 by wire. The obstacle information may be wirelessly transmitted by a publicly known radio system.

(6) ECU Group 25

The ECU group 25 controls each part of the vehicle and is composed of various ECUs, such as engine ECU, brake ECU, air conditioning ECU, navigation ECU, and the like. The ECU group 25 transmits time information, speed information, anomaly information, and the like to the image processor 11 by wire. These pieces of information may be wirelessly transmitted by a publicly known radio system.

<Description of Operation>

Description will be given to processing carried out by the image processing unit 18 of the image processor 11, and the operation of the image processor 11 will be thereby described.

(1) Reverse Processing

First, description will be given to reverse processing (or processing at vehicle backing operation) carried out by the image processing unit 18 of the image processor 11 with reference to the flowchart in FIG. 2. The execution of the reverse processing is started when the image processing unit 18 receives a signal indicating that the shift position has been changed to the R position from the shift position sensor 23 through the information input interface 17.

When the image processing unit 18 of the image processor 11 starts the execution of the reverse processing, first, it identifies the previously selected mask (S105). This is done by reading the identification information (ID) of mask information from the previously selected mask storage unit 14.

Subsequently, the image processing unit reads mask information corresponding to the identification information (ID) from the mask information storage unit 13 (S110). Description will be given to an example of mask information using the mask information file 350 illustrated in FIG. 6.

The mask information file 350 is constructed of: a header portion composed of the ID of a mask, the R value of the mask, the G value of the mask, the B value of the mask, and the luminance of the mask; and a data portion composed of a set of bits in correspondence with dot values constructing an image. The ID of each mask is identification information (ID) for identifying the mask information file. The R value of each mask is the value of R (Red) of dots to be masked in RGB color representation. The G value of each mask is the value of G (Green) of dots to be masked in RGB color representation. The B value of each mask is the value of B (Blue) of dots to be masked in RGB color representation.

The disposition of bits in the data portion corresponds to the dot positions in an actual image. The value of "−1" represents a bit indicating that a dot is to be masked, and the value of "1" represents a bit indicating that a dot is not to be masked. That is, a dot in an image corresponding to a point at which the bit value is "−1" is masked in a color corresponding to the R value, G value, and B value.

In the example, there is mask information with respect to each mask type and each mask size. Mask information without a masked area (that is, mask information in which all the bit values are "1") is also stored in the mask information storage unit 13.

Figure 2:
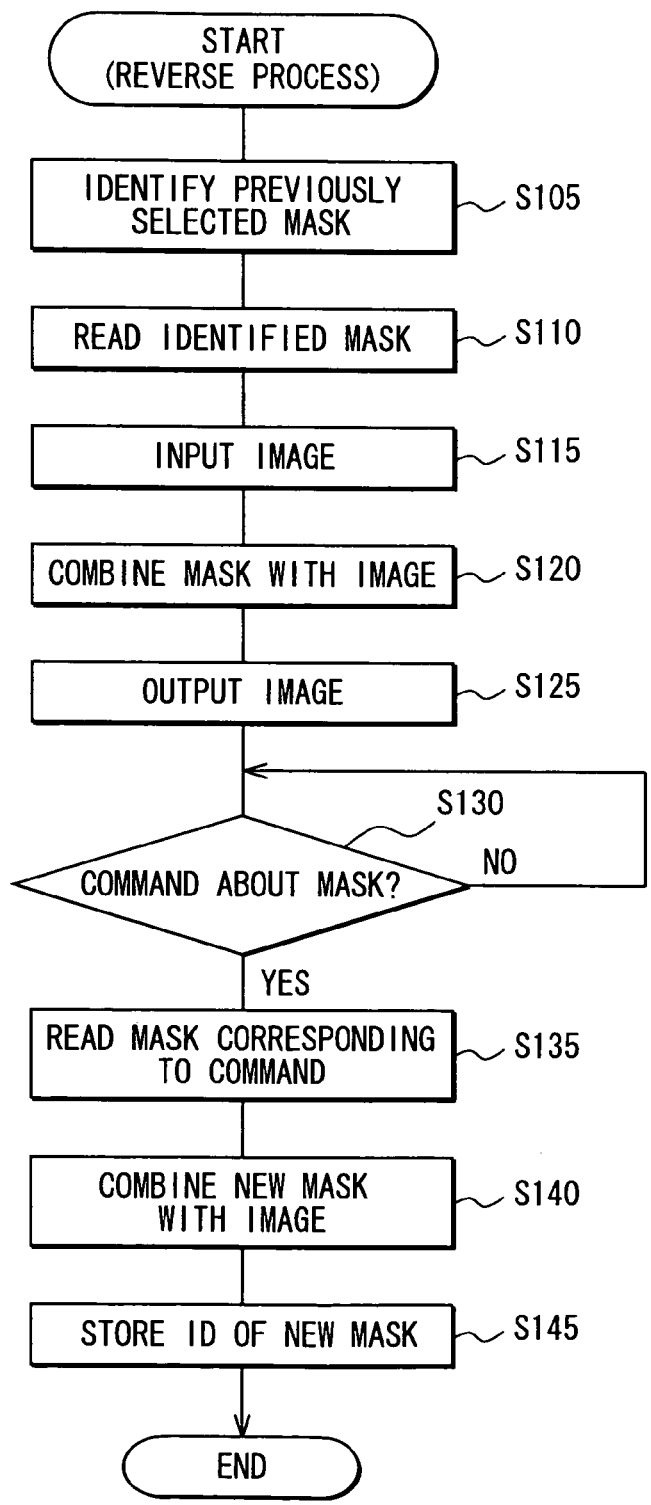
FIG. 2 is a flowchart illustrating reverse processing.

The description will be back to FIG. 2. The image processing unit 18 subsequently starts to input an image signal through the image input interface 12 (S115). Then, it configures a mask based on the mask information inputted at Step S110 and starts to combine the mask with an image inputted through the image input interface 12 (S120). Subsequently, the image processing unit starts to output an image signal indicating the combined image to the display device 22 through the image output interface 15 (S125). Concrete examples of images displayed on the display device 22 will be described later.

Subsequently, the image processing unit 18 determines whether or not there has been an operation command about the mask from the user through the operation unit 16 (S130). This is done by determining any operation command inputted to the operation unit 16. The operation command about a mask refers to a command to change the type of the mask, a command to change the size of the mask, a command to erase the mask, or the like.

When it is determined at Step S130 that there has been an operation command about the mask (S130: Yes), the flow proceeds to Step S135. When it is determined that there has not been an operation command about the mask (S130: No), the flow remains at this step until an operation command about the mask occurs.

At Step S135, to which the flow proceeds when it is determined that there has been an operation command about the mask, the image processing unit reads mask information corresponding to the operation command from the mask information storage unit 13. Then, it configures a mask from the read mask information and starts to combine the newly configured mask, in place of the mask that has been combined, with an image acquired from the camera 21 (S140). At the same time, the image processing unit 18 stores the identification information (ID) of the mask information read from the mask information storage unit 13 at Step S135 in the previously selected mask storage unit 14 and updates the storage unit (S145). Then, the processing once ends.

(2) Reported Information Superimposition Processing

Figure 3A:
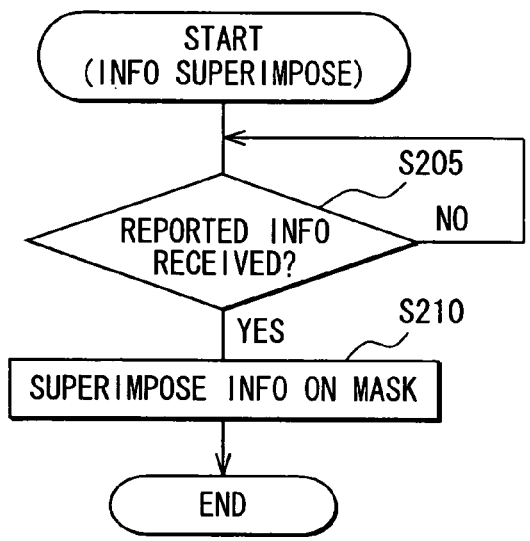
FIG. 3A is a flowchart illustrating reported information superimposition processing.

Description will be given to reported information superimposition processing carried out by the image processing unit 18 of the image processor 11 with reference to the flowchart in FIG. 3A. The execution of the reported information superimposition processing is started in parallel when the above-mentioned reverse processing is started.

When the image processing unit 18 of the image processor 11 starts the execution of the reported information superimposition processing, it determines whether or not information to be reported (reported information) has been received from the ECU group 25 through the information input interface 17 (S205). Possible examples of reported information include time information, information on the state of the vehicle, and the like. When it is determined at Step S205 that reported information has been received (S205: Yes), the flow proceeds to Step S210. When it is determined that reported information has not been received (S205: No), the flow remains at this step until reported information is received.

At Step S210, to which the flow proceeds when it is determined that reported information has been received, a character or a graphic based on the reported information is superimposed on the mask combined with an image by the above-mentioned reverse processing. Concrete examples of images displayed on the display device 22 will be described later. Thereafter, the processing once ends.

Up to this point, description has been given to the reported information superimposition processing. As the result of this processing, the portion of a picked-up image (image picked up by the camera 21) displayed on the display device 22 is not hidden by reported information and the user can recognize the reported information.

(3) Operation Icon Superimposition Processing

Figure 3B:
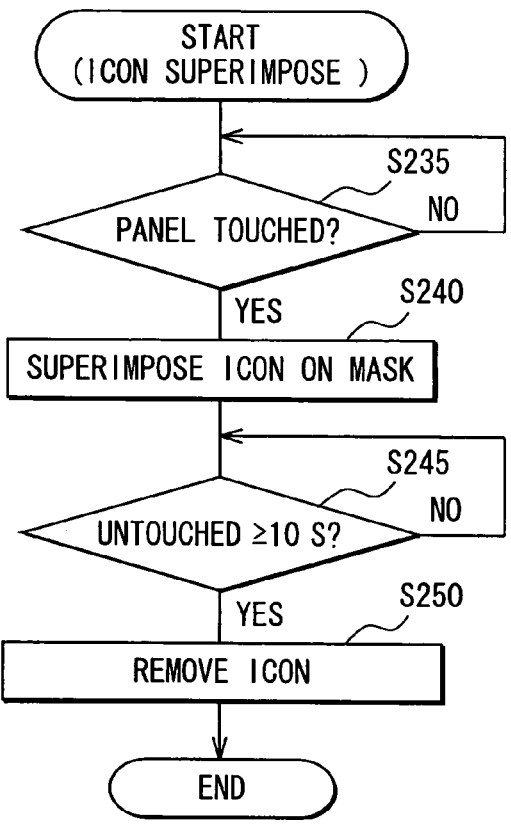
FIG. 3B is a flowchart illustrating operation icon superimposition processing.

Description will be given to operation icon superimposition processing carried out by the image processing unit 18 of the image processor 11 with reference to the flowchart in FIG. 3B. The execution of the operation icon superimposition processing is started in parallel when the above-mentioned reverse processing is started.

When the image processing unit 18 of the image processor 11 starts the execution of the operation icon superimposition processing, first, it determines whether or not the touch panel (operation unit 16) provided in the display surface of the display device 22 has been touched (S235). When it is determined that the touch panel has been touched (S235: Yes), the flow proceeds to Step S240. When it is determined that the touch panel has not been touched (S235: No), the flow remains at this step until the touch panel is touched.

At Step S240, to which the flow proceeds when it is determined that the touch panel has been touched, an operation icon is superimposed on the mask combined with an image by the above-mentioned reverse processing. Concrete examples of images displayed on the display device 22 will be described later.

Subsequently, it is determined whether or not the touch panel has been left untouched for 10 seconds or longer after the touch panel was touched (S245). When it is determined that the touch panel has been left untouched for 10 second or longer (S245: Yes), the flow proceeds to Step S250. When it is determined that the touch panel has not been left untouched for 10 seconds or longer (S245: No), the flow remains at this step until the touch panel is left untouched for 10 seconds or longer.

At Step S250, to which the flow proceeds when it is determined that the touch panel has been left untouched for 10 seconds or longer, the operation icon superimposed at Step S240 is removed (or caused to disappear) from the surface of the mask. Then, the processing once ends.

Up to this point, description has been given to the operation icon superimposition processing. As the result of this processing, the portion of a picked-up image (image picked up by the camera 21) displayed on the display device 22 is not hidden by an operation icon and the user can operate the operation icon while viewing the icon.

(4) Obstacle Report Processing

Figure 3C:
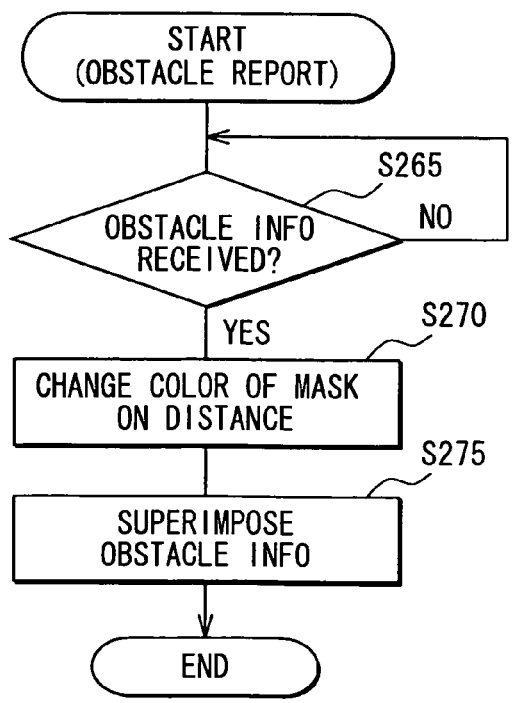
FIG. 3C is a flowchart illustrating obstacle report processing.

Description will be given to obstacle report processing carried out by the image processing unit 18 of the image processor 11 with reference to the flowchart in FIG. 3C. The execution of the obstacle report processing is started in parallel when the above-mentioned reverse processing is started.

When the image processing unit 18 of the image processor 11 starts the execution of the obstacle report processing, it determines whether or not obstacle information has been received from the obstacle detector 24 through the information input interface 17 (S265). When it is determined that obstacle information has been received (S265: Yes), the flow proceeds to Step S270. When it is determined that obstacle information has not been received (S265: No), the flow remains at this step until obstacle information is received.

At Step S270, to which the flow proceeds when it is determined that obstacle information has been received, the color of the mask combined with an image by the above-mentioned reverse processing is changed to a color corresponding to the distance to the obstacle. Specifically, the following measure is possible: when the distance to an obstacle is not less than 5 m, the masked portion is colored in black; when the distance to an obstacle is not less than 1 m and less than 5 m, the masked portion is colored in brown; and when the distance to an obstacle is less than 1 m, the masked portion is colored in red.

In addition, a numerical value indicating the distance to the obstacle is superimposed on the mask in changed color (S275). When other information about the obstacle, such as the number of obstacles, the size of an obstacle, and the like, can be acquired from the obstacle detector 24, it is desirable that these pieces of information should be additionally superimposed on the mask. Then, the processing once ends.

Up to this point, description has been given to the obstacle report processing. As the result of this processing, the color of a mask is changed when an obstacle is present. Therefore, the user can immediately recognize the presence of the obstacle. Since the color of a mask is changed according to the distance to an obstacle, in addition, the user can learn the approximate distance to the obstacle from the color of the mask. Further, since the numeric value indicating the distance to an obstacle is displayed on a mask, the user can accurately grasp the distance to the obstacle by viewing the numeric value.

(5) Person Report Processing

Figure 4:
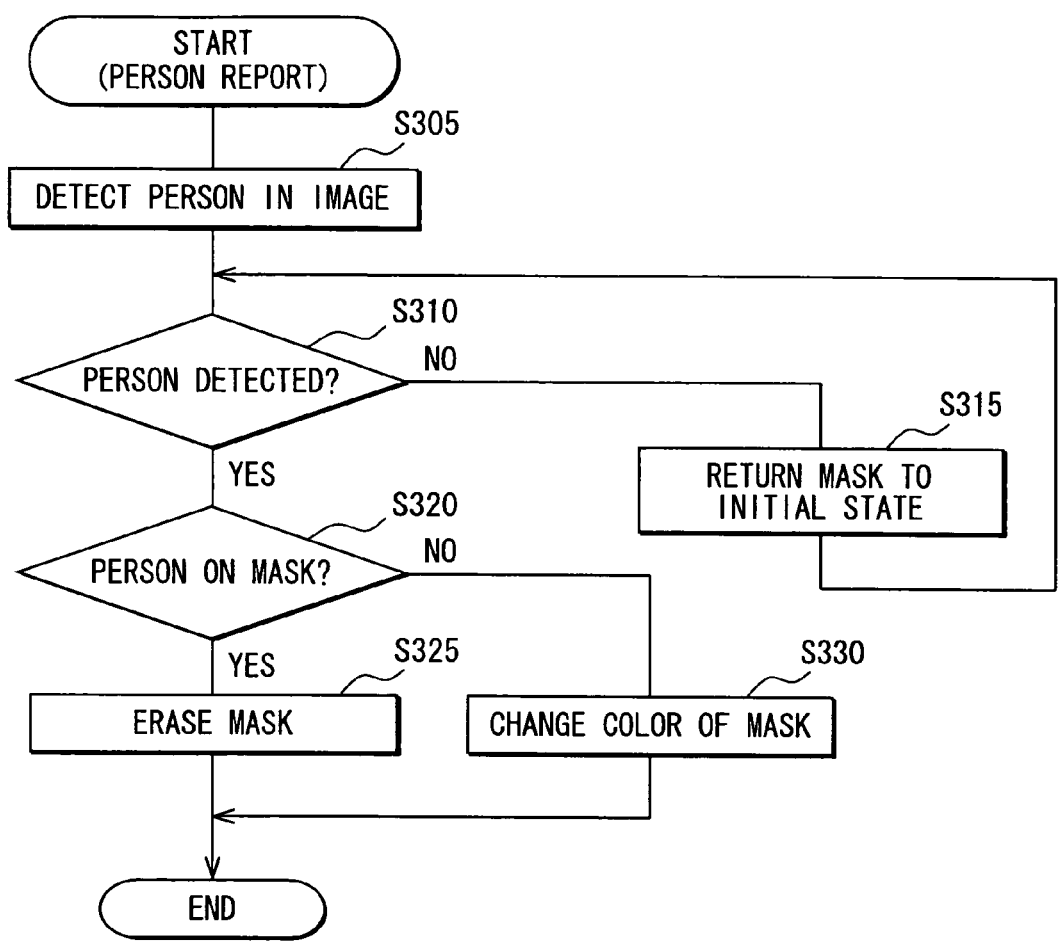
FIG. 4 is a flowchart illustrating person report processing.

Description will be given to person report processing carried out by the image processing unit 18 of the image processor 11 with reference to the flowchart in FIG. 4. The execution of the person report processing is started in parallel when the above-mentioned reverse processing is started.

When the image processing unit 18 of the image processor 11 starts the execution of the person report processing, it starts to detect whether or not any person is embraced in an image inputted from the camera 21 through the image input interface 12 (S305). This detection is carried out by a publicly known image processing technique.

After the detection is started, it is determined whether or not any person has been actually detected in the image (S310). When it is determined that a person has been detected (S310: Yes), the flow proceeds to Step S320. When it is determined that a person has not been detected (S310: No), the flow proceeds to Step S315.

At Step S315, to which the flow proceeds when it is determined that a person has not been detected, the following processing is carried out on a case-by-case basis: when a mask has been erased at Step S325 in the previous flow or processing, described later, the mask in the initial state is displayed; and when the color of a mask has been changed at Step S315 in the previous flow or processing, described later, the color of the mask is returned to the color of the mask in the initial state. Then, the flow returns to Step S310.

At Step S320, to which the flow proceeds when it is determined that a person has been detected, it is determined whether or not the detected person will be hidden by a mask of an image displayed on the display device 22. When it is determined that the person will be hidden by the mask (S320: Yes), the flow proceeds to Step S325. When it is determined that the person will not be hidden by the mask (S320: No), the flow proceeds to Step S330.

At Step S325, to which the flow proceeds when it is determined that the person will be hidden by the mask, the mask being presently combined is entirely erased. At this time, the mask may be partly erased. (For example, the following measure may be taken: only the upper mask or the lower mask under which the person will be hidden is erased.) Then, the processing once ends.

At Step S330, to which the flow proceeds when it is determined that the person will not be hidden by the mask, the color of the mask is changed to a predetermined color. It is desirable that this color should be such that the user is strongly alerted, for example, the color should be red. Or, the mask may be caused to blink or the color of the mask may be varied every second. Then, the processing once ends.

Up to this point, description has been given to the person report processing. As the result of this processing, the color of a mask is changed when it is detected that a person is embraced in an image. Therefore, it is possible for the user to easily learn that there is a person within the field of the camera and more positively pay attention to the person. When a person will be hidden by a mask, the mask is erased. Therefore, it is possible to prevent the person from being hidden by the mask and to make the user visually recognize the person by an image.

(6) Display Switching Processing

Figure 5:
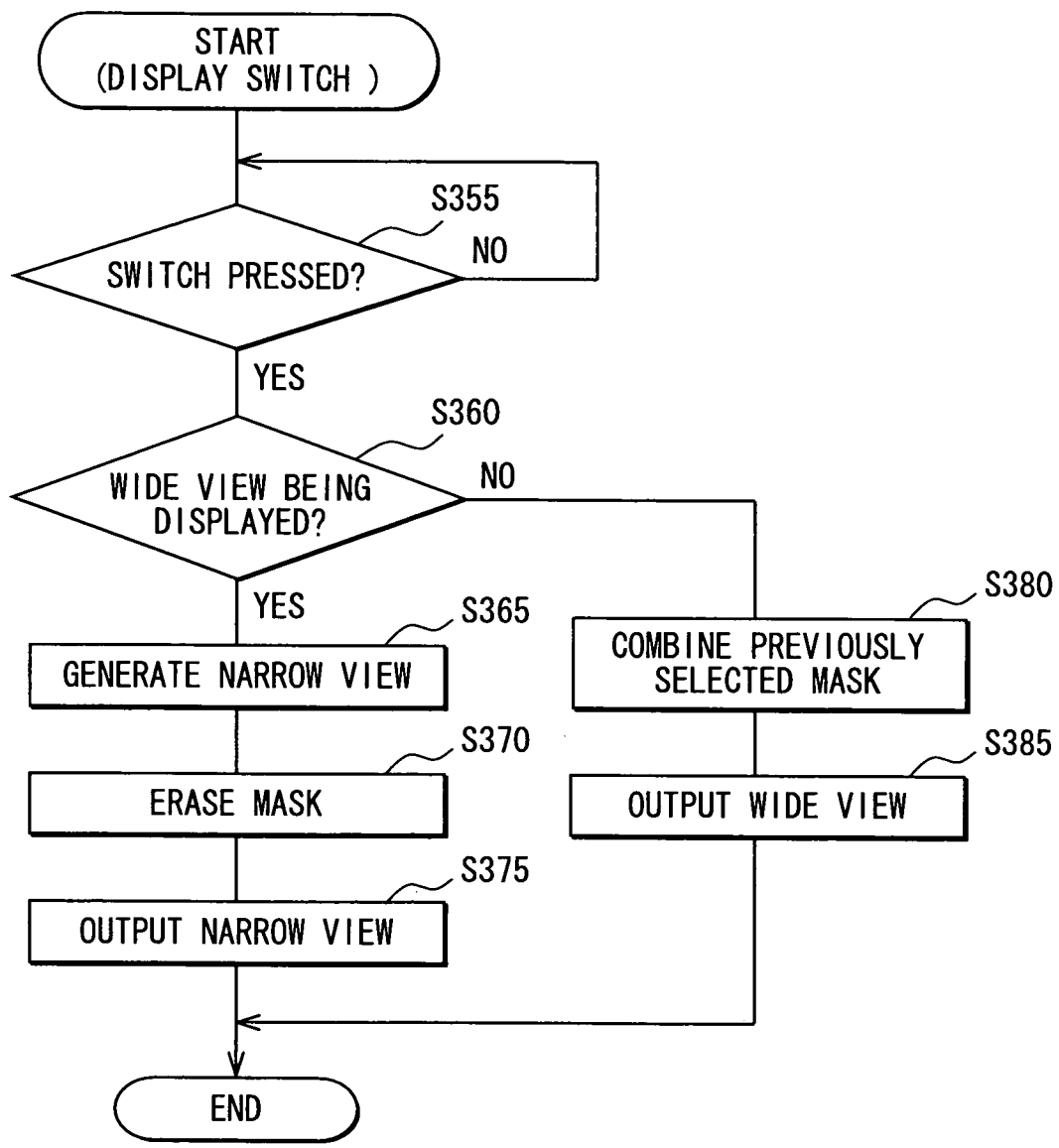
FIG. 5 is a flowchart illustrating display switching processing.

Description will be given to display switching processing carried out by the image processing unit 18 of the image processor 11 with reference to the flowchart in FIG. 5. The execution of the display switching processing is started in parallel when the above-mentioned reverse processing is started.

When the image processing unit 18 of the image processor 11 starts the execution of the display switching processing, it determines whether or not a display changeover switch has been pressed (S355). The display changeover switch is used to switch the display mode between a mode in which a wide view angle image is displayed on the display device 22 and a mode in which a narrow view angle image is displayed. A part of the switches composing the operation unit 16 is assigned to the function of this switch. When it is determined at Step S355 that the display changeover switch has been pressed (S355: Yes), the flow proceeds to Step S360. When it is determined that the display changeover switch has not been pressed (S355: No), the flow remains at this step until the display changeover switch is pressed.

At Step S360, to which the flow proceeds when it is determined that the display changeover switch has been pressed, it is determined whether or not a wide view angle image is presently being displayed on the display device 22 (S360). When it is determined that a wide view angle image is being displayed (S360: Yes), the flow proceeds to Step S365. When it is determined that a wide view angle image is not being displayed, that is, a narrow view angle image is being displayed (S360: No), the flow proceeds to Step S380.

At Step S365, to which the flow proceeds when it is determined that a wide view angle image is being displayed, the generation of a narrow view angle image from the wide view angle image is started. Specifically, the image processing in which the following is implemented is started: a predetermined portion is trimmed away from the wide view angle image and this portion is digitally zoomed in and enlarged. Subsequently, the combination of the mask is stopped, i.e., the mask is erased (S370). Then, the output of the narrow view angle image to the display device 22 through the image output interface 15 is started (S375). Then, the processing once ends.

At Step S380, to which the flow proceeds when it is determined that a wide view angle image is not being displayed, the identification information (ID) of mask information is read from the previously selected mask storage unit 14. Then, the mask information used to display the wide view angle image is identified, and the corresponding mask information is read from the mask information storage unit 13 and the combination of a mask is resumed. Subsequently, the output of the wide view angle image to the display device 22 through the image output interface 15 is started (S385). Then, the processing once ends.

EXAMPLES OF DISPLAYED IMAGES (1) Example of Unmasked Image

Figure 7:
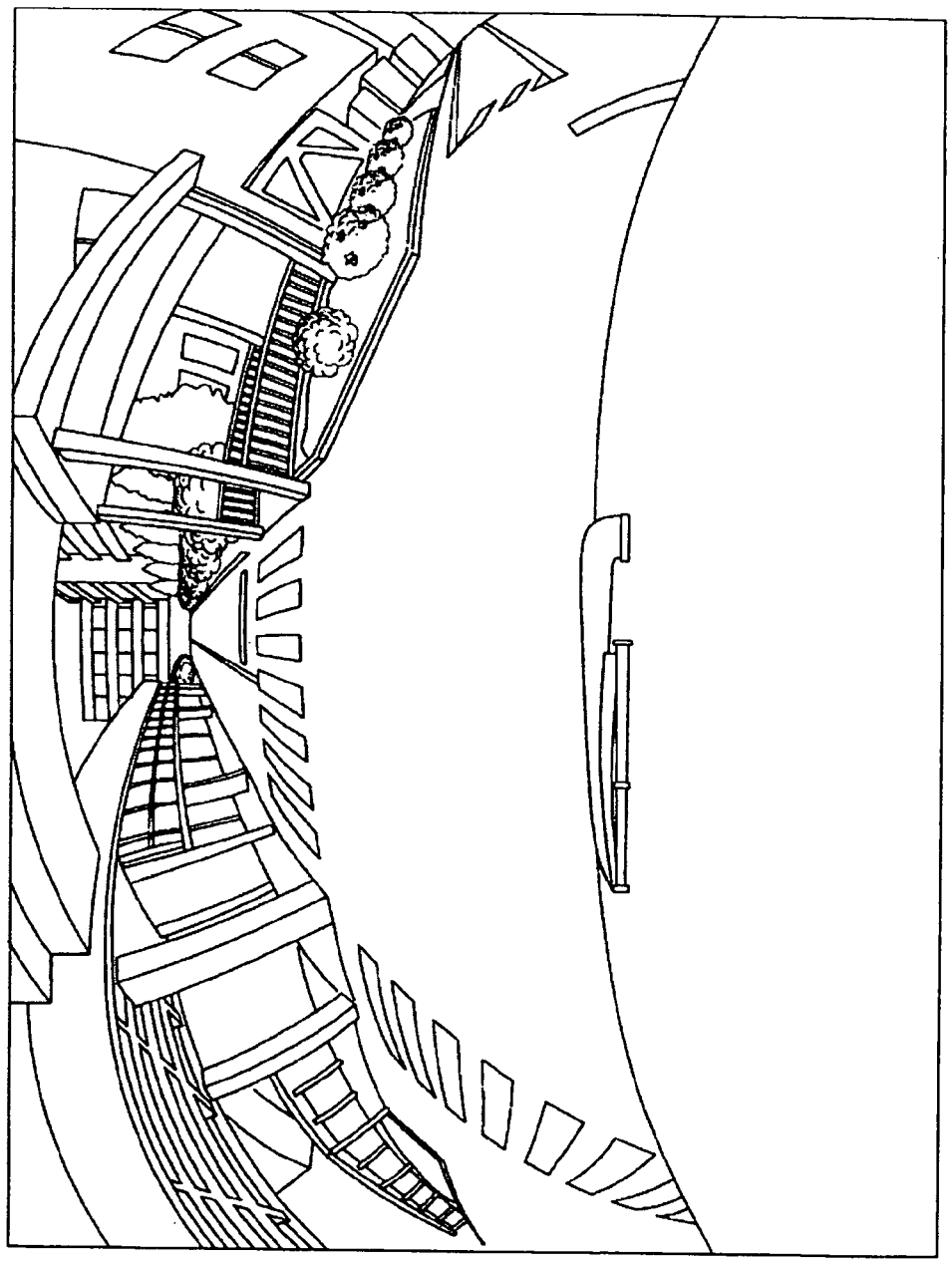
FIG. 7 illustrates an example of an unmasked image.

The example of an image illustrated in FIG. 7 is obtained by the camera 21 installed at the upper part of the rear end of a vehicle to pick up an image of the scene behind the vehicle and this image is not masked. As illustrated in FIG. 7, the peripheral portion of the image is distorted and especially, the image is extremely distorted at the four corners. The following examples of images are composed similarly with the example of an image illustrated in FIG. 7.

(2) Basic Type 1 of Mask

Figure 8:
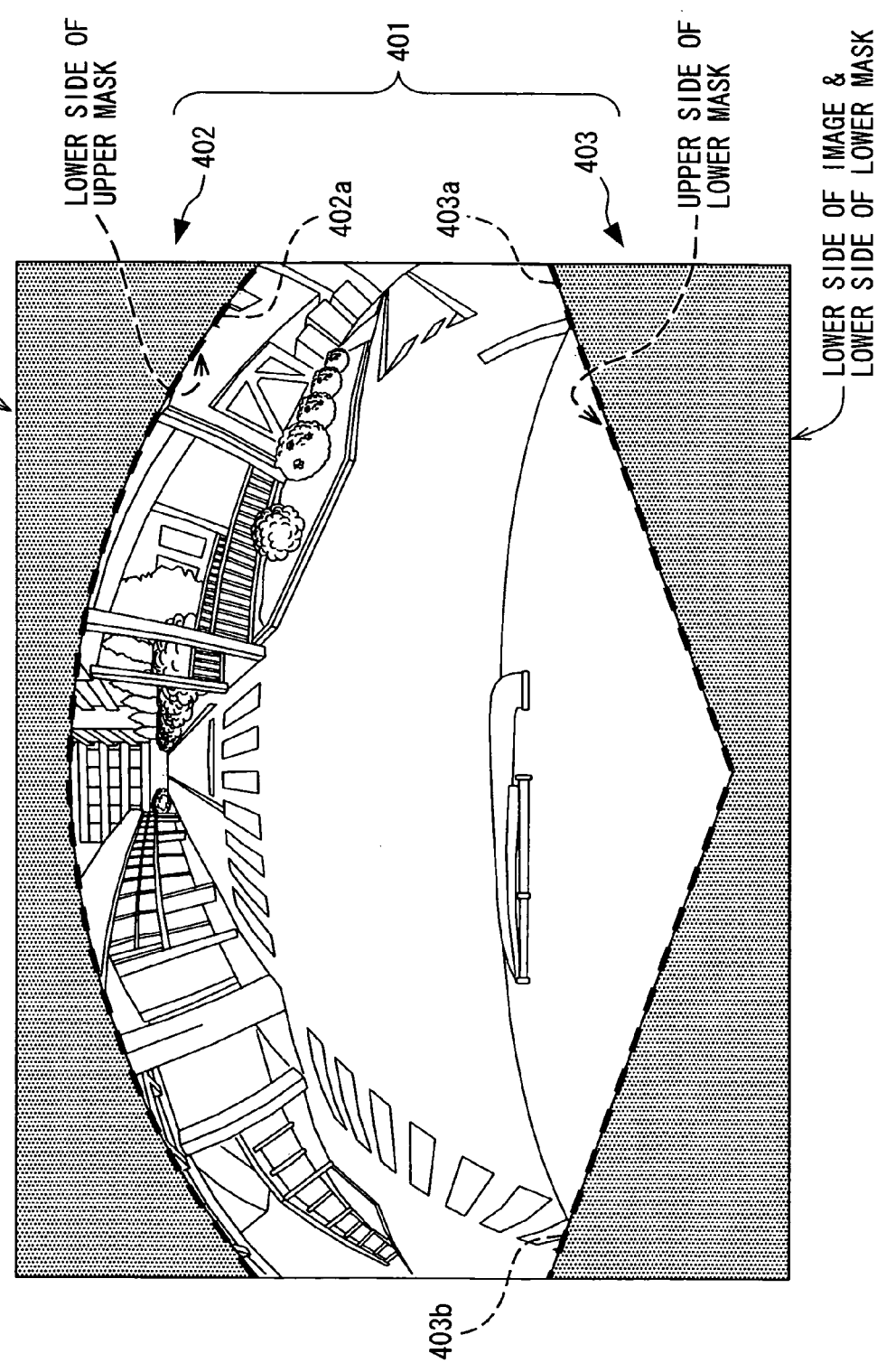
FIG. 8 illustrates basic type 1 of mask.

The example of an image illustrated in FIG. 8 is obtained by combining a mask 401 with the example of an image illustrated in FIG. 7. The mask 401 is composed of an upper mask 402 disposed along the upper side of the image in the example and a lower mask 403 disposed along the lower side of the image in the example.

The upper mask 402 is in a shape concave on the lower side thereof and contains an arc portion 402a running along a distorted curve of the image in the horizontal direction. In other words, the unmasked image protrudes upwardly into the upper mask 402.

The lower mask 403 is in a shape concave on the upper side thereof and the concave portion is composed of a first side 403a and a second side 403b. The angle formed between the first side 403a and the second side 403b is greater than 180 degrees as viewed from the lower mask 403 side (the unmasked portion of the image is made smaller than 180 degrees). That is, the concave portion of the lower mask 403 is substantially in V shape. In other words, the unmasked image protrudes downwardly into the lower mask 403.

When an image obtained from the camera 21 is masked with this mask, the peripheral portion of the image that is prone to be distorted become invisible and thus the discomfort the user feels because of distortion can be reduced. As mentioned above, the upper mask 402 is concave on the lower side thereof and the lower mask 403 is concave on the upper side thereof. Therefore, the user can view an unmasked image with the relatively much information of the central portion of the image in the horizontal direction. The arc portion 402a of the upper mask 402 is in a shape along a distorted curve of the image in the horizontal direction, and thus the user can grasp the arc portion 402a as a reference line equivalent to the horizon. That is, the user can easily recognize the positional relation between objects. The concave portion of the lower mask 403 is composed of the first side 403a and the second side 403b and an image can be made to appear to radiate. Therefore, the user can easily get the feeling of spread.

(3) Example 1 with View Angle Indication Added

Figure 9:
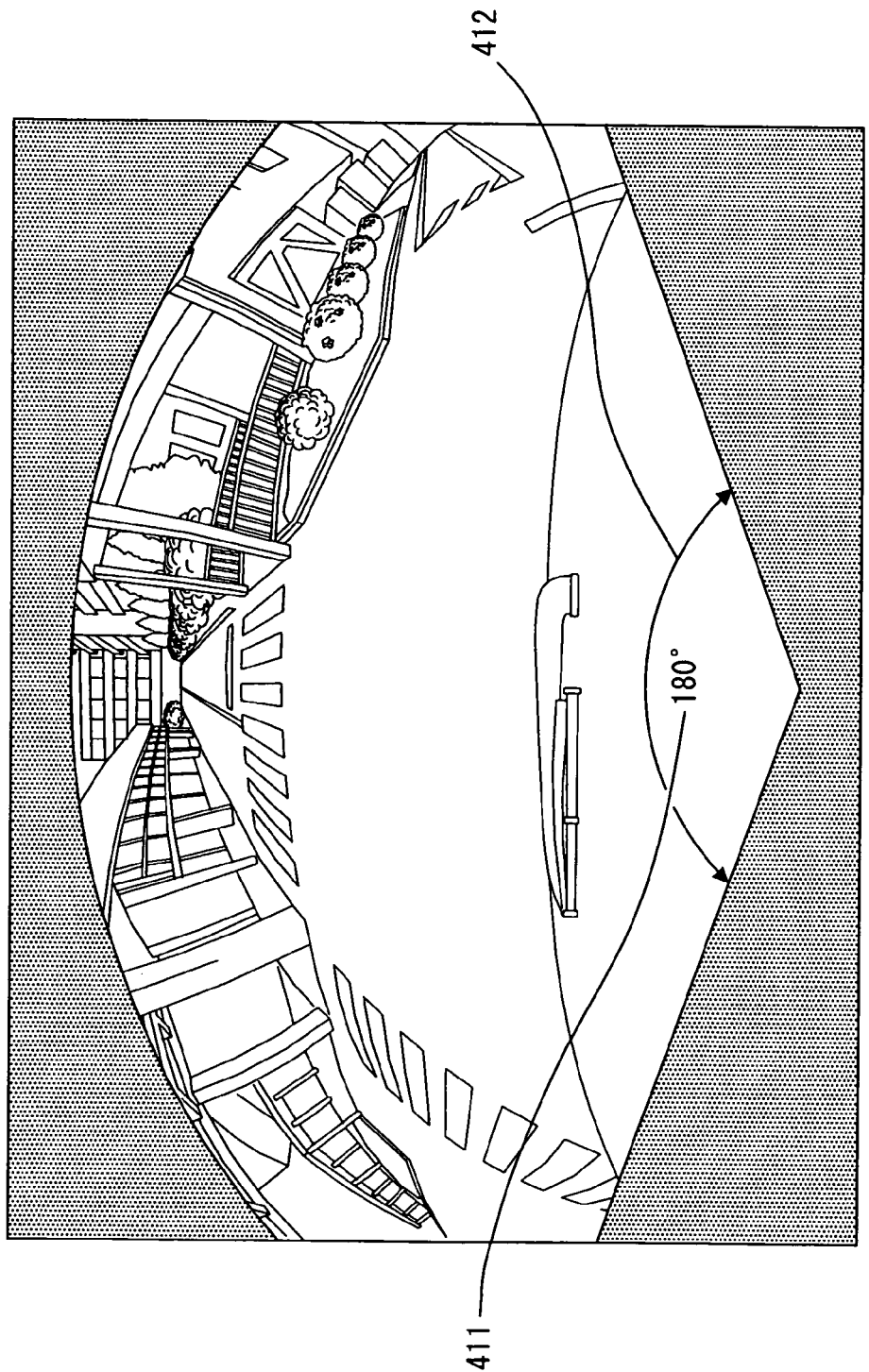
FIG. 9 illustrates example 1 in which view angle display is added to an example of an image.

The example of an image illustrated in FIG. 9 is obtained by superimposing the following on the lower part of the image in the example illustrated in FIG. 8: an angle indication 411 indicating an angle of view and an arrow 412 indicating the range of the angle of view.

When an angle of view is indicated as mentioned above, the user can easily learn how large the angle of view of the presently displayed image is.

(4) Example 2 with View Angle Indication Added

Figure 10:
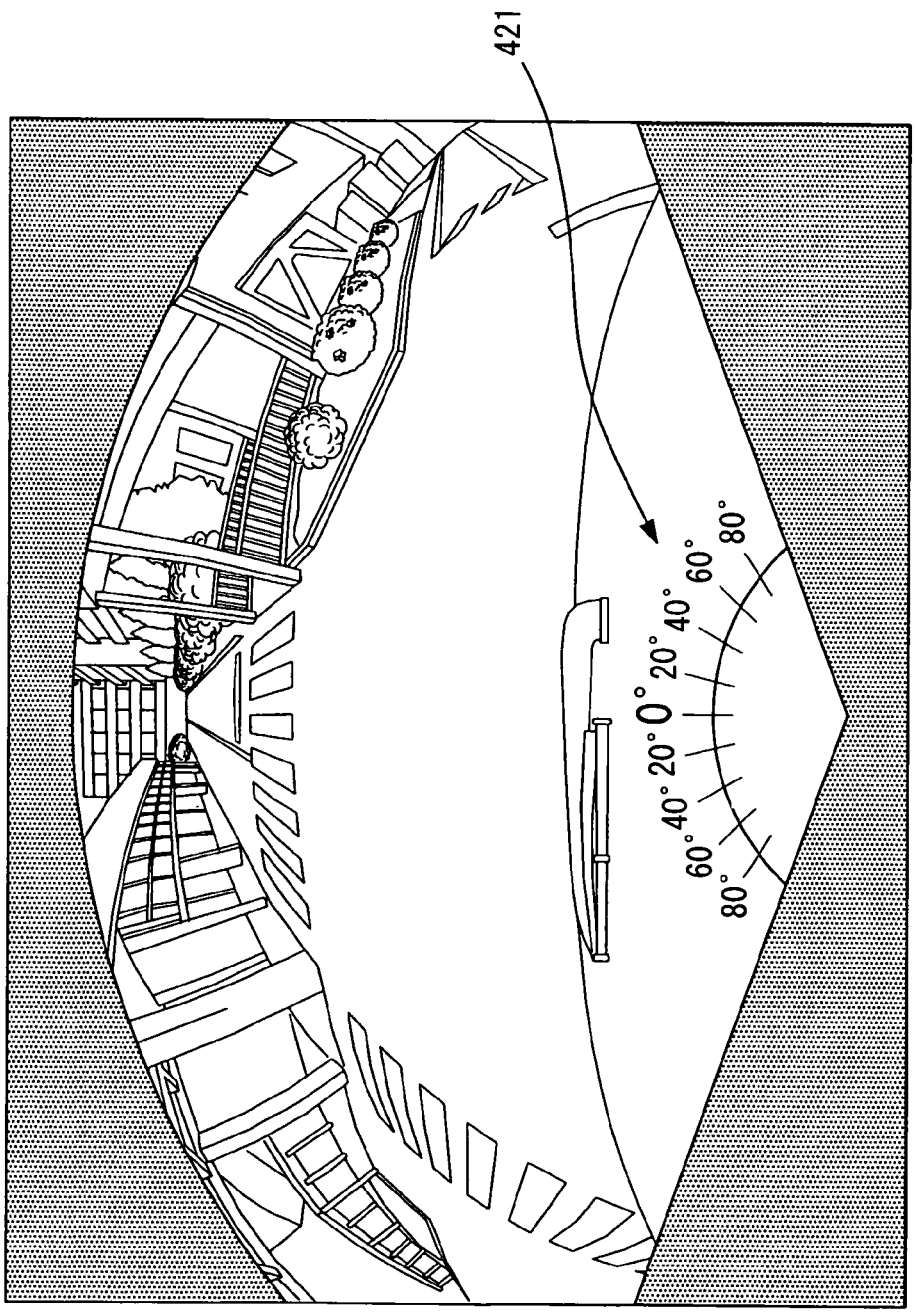
FIG. 10 illustrates example 2 in which view angle display is added to an example of an image.

The example of an image illustrated in FIG. 10 is obtained by superimposing a scale 421 on the lower part of the image in the example illustrated in FIG. 8.

When the scale 421 is displayed as mentioned above, the user can easily learn in which direction an object embraced in the presently display image exists.

(5) Example 3 with View Angle Indication Added

Figure 11:
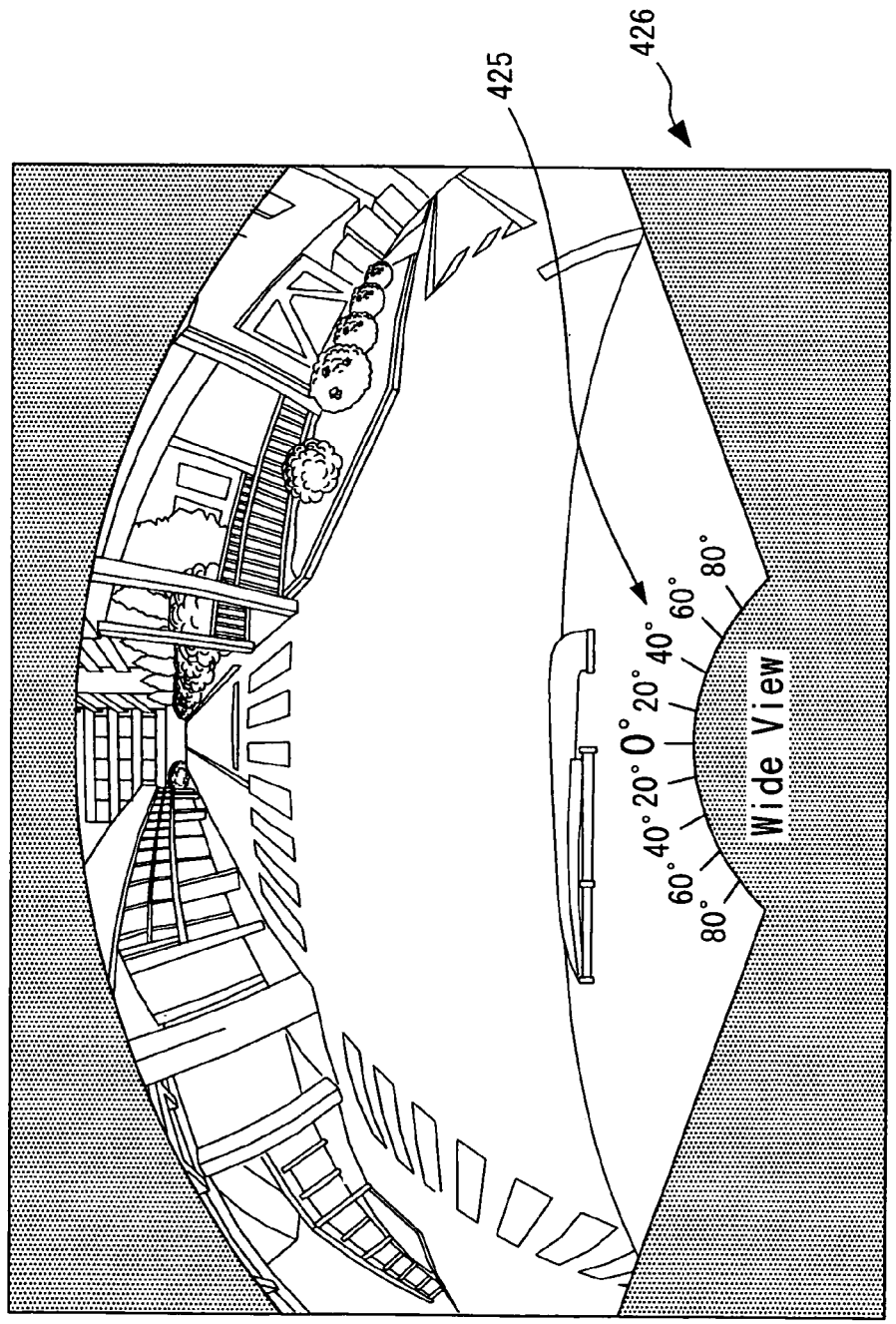
FIG. 11 illustrates example 3 in which view angle display is added to an example of an image.

The example of an image illustrated in FIG. 11 is obtained by taking the following measure based on the image in the example illustrated in FIG. 10: the area between the scale 425 and the lower mask 426 is solidly shaded and characters (Wide View) indicating the present display mode are displayed in the solidly shaded area.

When characters indicating the present display mode are displayed as mentioned above, the user can easily learn the display mode in which an image is presently being displayed.

(6) Example 4 with View Angle Indication Added

Figure 12:
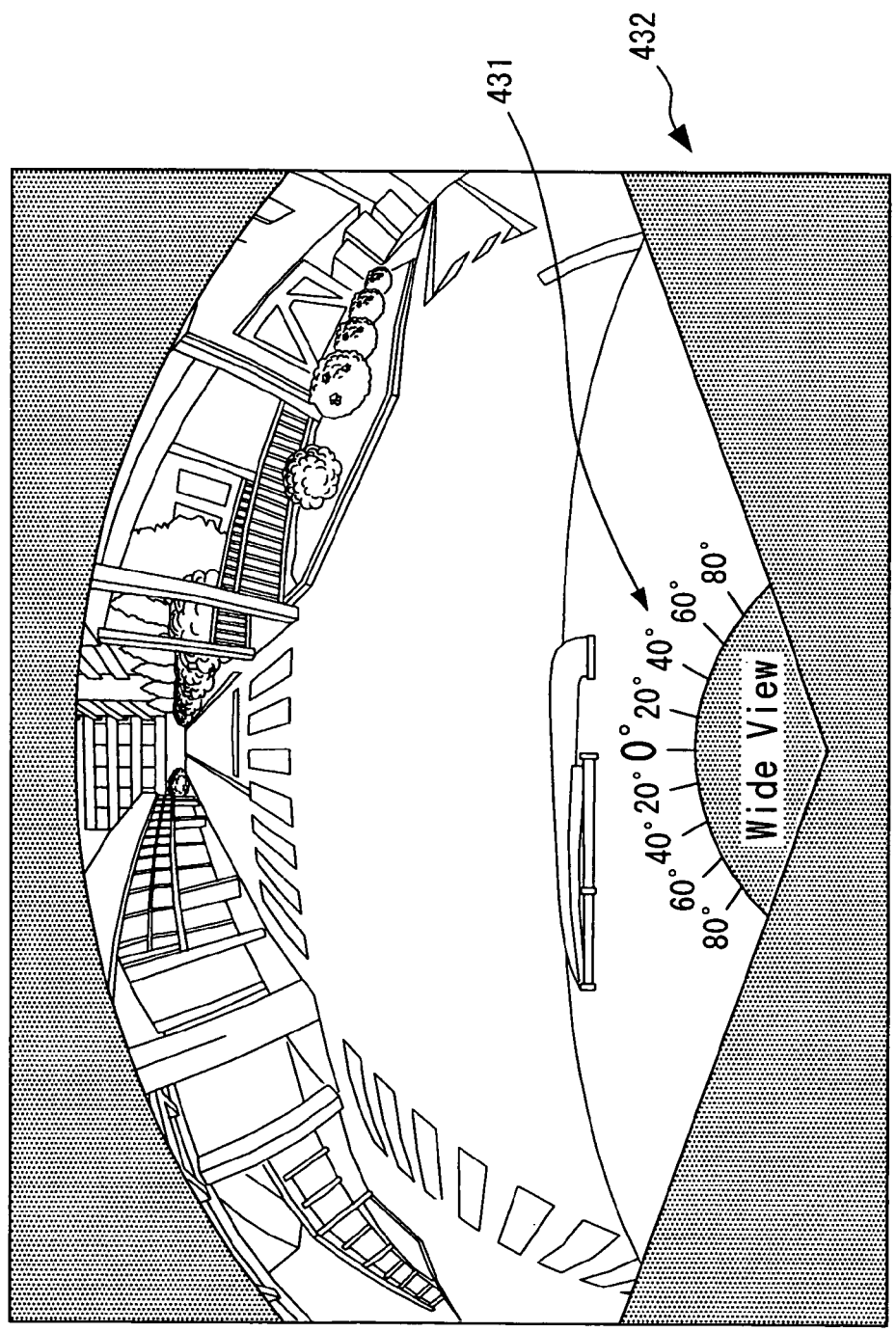
FIG. 12 illustrates example 4 in which view angle display is added to an example of an image.

The example of an image illustrated in FIG. 12 is obtained by taking the following measure based on the image in the example illustrated in FIG. 11: a gap is provided between the solidly shaded portion of the scale 431 and the lower mask 432.

When a gap is provided as mentioned above, an image can be made to appear to radiate and thus the user can easily get the feeling of spread.

(7) Example 5 with View Angle Indication Added

Figure 13:
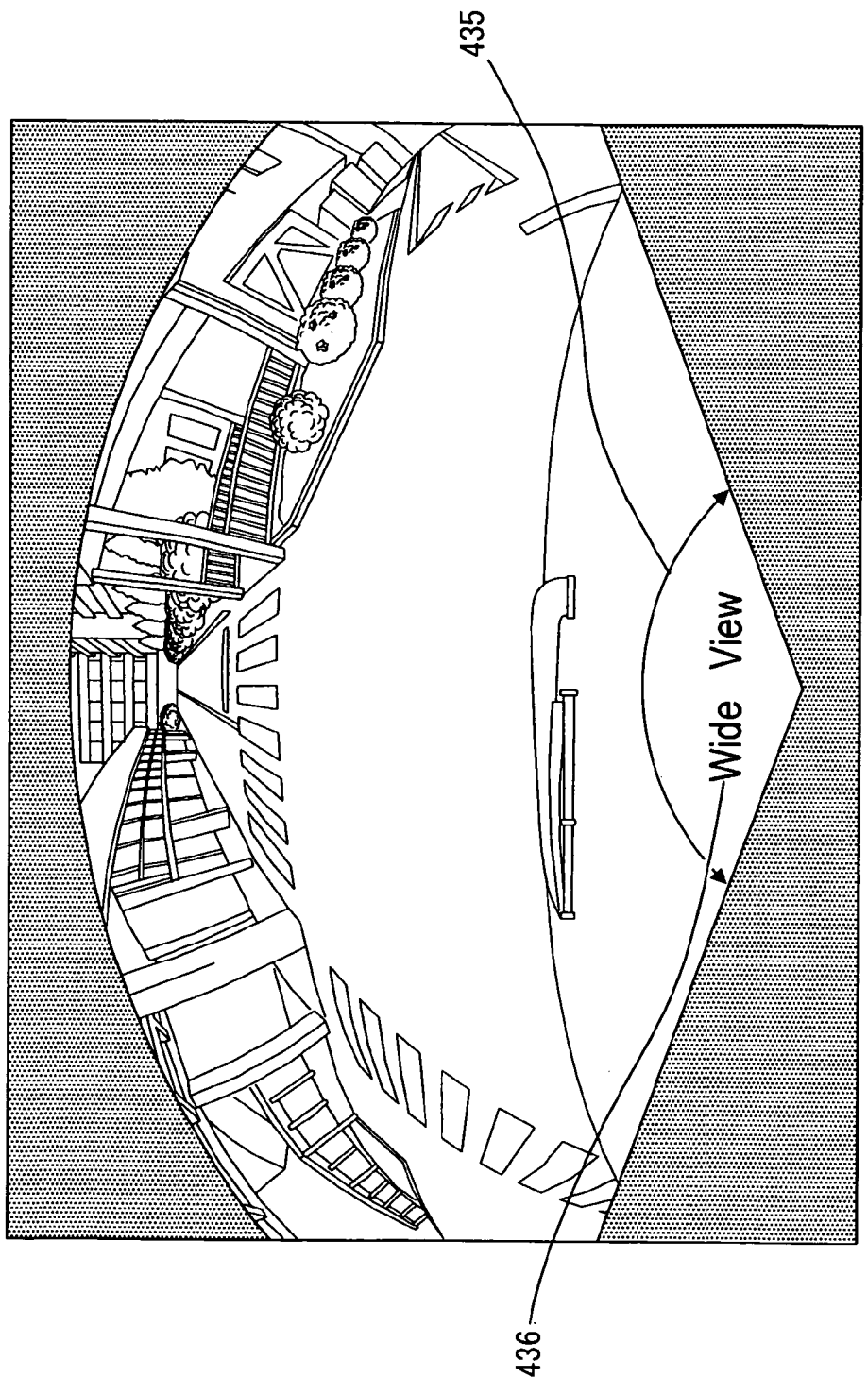
FIG. 13 illustrates example 5 in which view angle display is added to an example of an image.

The example of an image illustrated in FIG. 13 is obtained by displaying the following at the lower part of the image in the example illustrated in FIG. 8: an arrow 435 indicating the range of an angle of view and characters 436 indicating the present display mode.

When the arrow 435 and characters 436 mentioned above are displayed, the user can grasp the display mode (Wide View or Narrow View, etc.) relative to the length of the arrow 435 unlike cases where only characters 436 indicating the display mode are displayed. Therefore, the user can more easily and intuitively grasp what the present display mode is.

(8) Example with Vehicle Model Superimposed and Displayed

Figure 14:
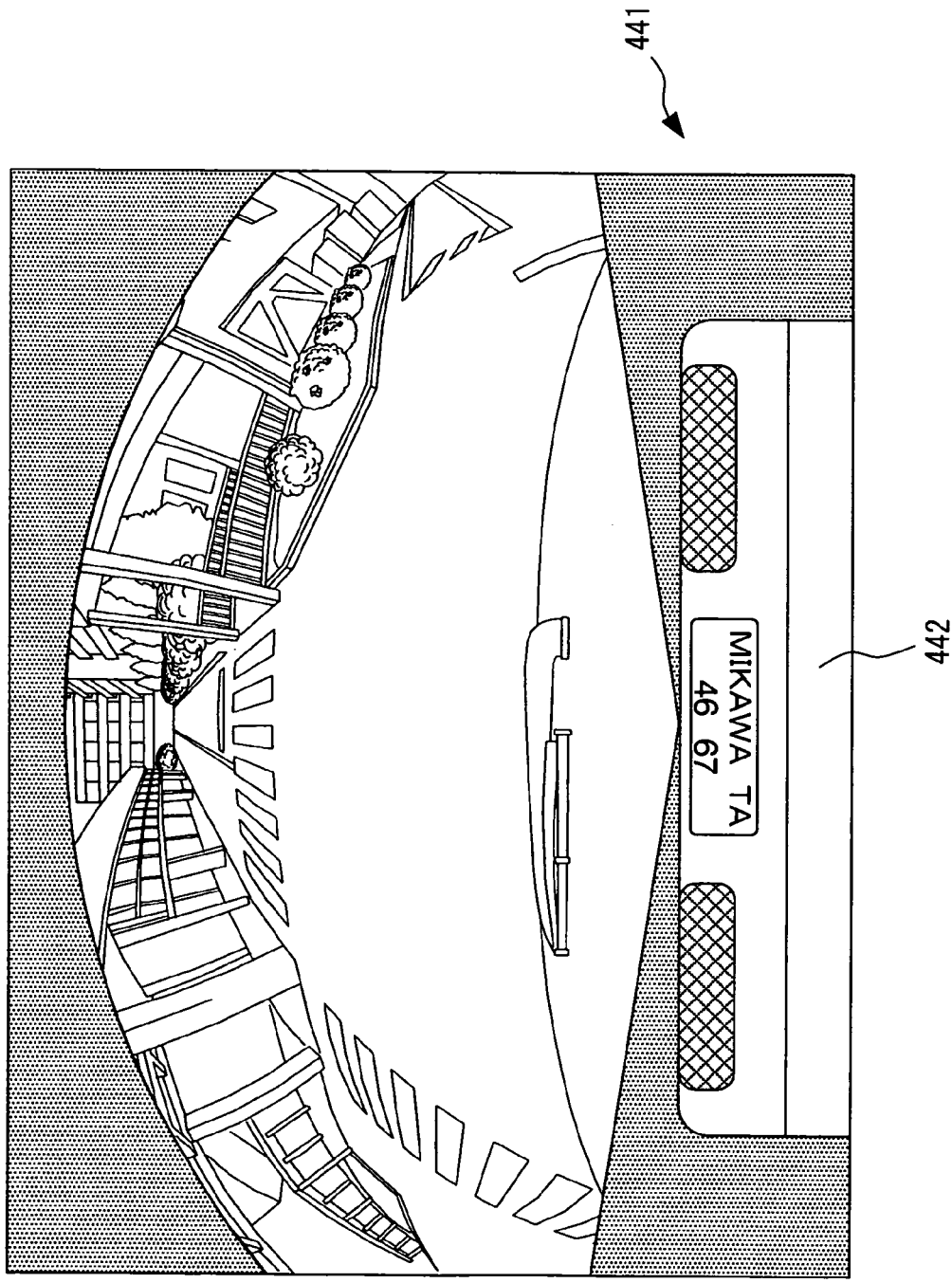
FIG. 14 illustrates an example in which a vehicle model is superimposed and displayed.

In the example of an image illustrated in FIG. 14, the central part of the lower mask 441 is disposed in an upper position than in the images in the examples illustrated in FIG. 8 to FIG. 13. In addition, a model 442 of the rear part of the vehicle is superposed and displayed on the lower mask 441.

When a model 442 of the rear part of the vehicle is superposed and displayed as mentioned above, the user can intuitively grasp that an image displayed on the display device 22 is an image of the scene behind the vehicle. Further, the user can easily grasp the positional relation between objects embraced in the image.

(9) Basic Type 2 of Mask

Figure 15:
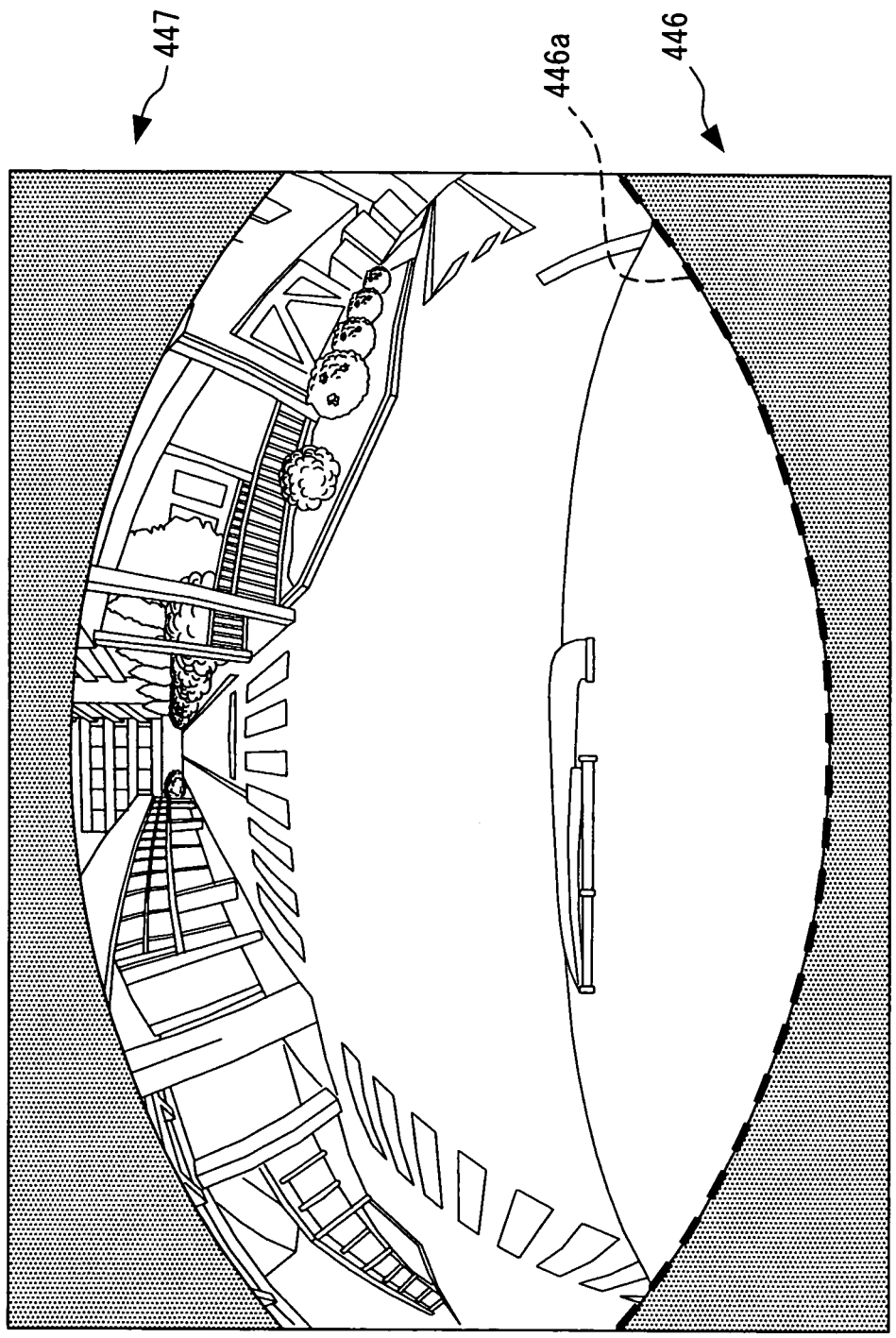
FIG. 15 illustrates basic type 2 of mask.

The example of an image illustrated in FIG. 15 is obtained by symmetrically shaping the lower mask 446 and the upper mask 447. Specifically, the lower mask 446 is concave on the upper side thereof and an arc portion 446a is in a shape along a distorted curve of the image in the horizontal direction.

When an image obtained from the camera 21 is masked with this mask, the peripheral portion of the image that is prone to be distorted becomes invisible and thus the discomfort the user feels because of distortion can be reduced. As mentioned above, the upper mask 447 is concave on the lower side thereof and the lower mask 446 is concave on the upper side thereof. Therefore, the user can view an unmasked image with the relatively much information of the central portion of the image in the horizontal direction. The arc portion 446a of the lower mask 446 as well as that of the upper mask 447 is also in a shape along a distorted curve of the image in the horizontal direction. Therefore, the user can grasp the arc portion 446a as a reference line equivalent to the horizon. That is, the user can easily recognize the positional relation between objects in a distorted image.

In the example, both the upper mask 447 and the lower mask 446 are in such a shape that the boundaries between them and the image portion run along a distorted curve. The following mask is also possible: a mask obtained by combining an upper mask the boundary between which and the image portion is in inverted V shape and a lower mask the boundary between which and the image portion is in a shape along a distorted curve.

(10) Example with Slider Displayed

Figure 16:
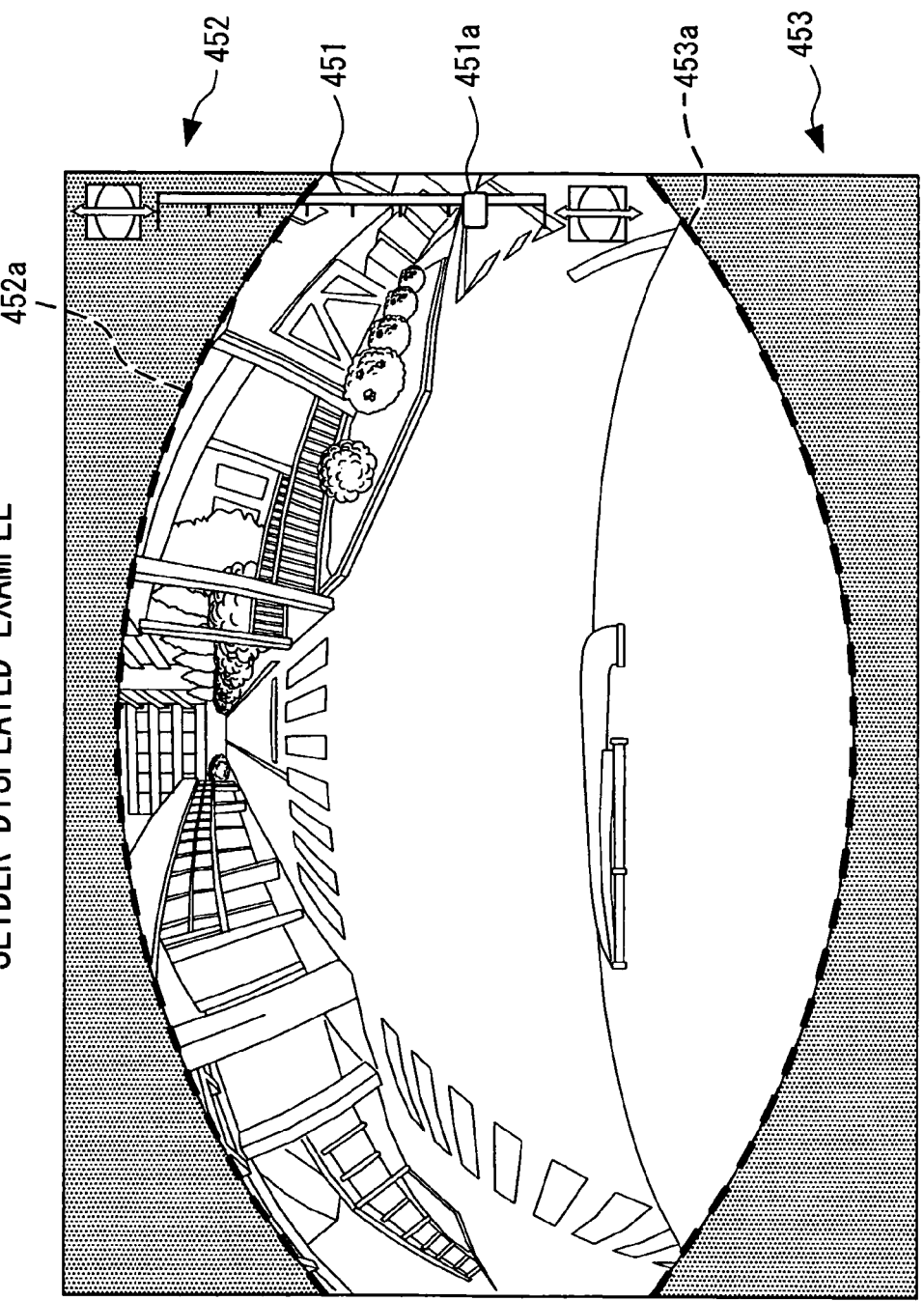
FIG. 16 illustrates an example in which a slider is displayed in an example of an image.

The example of an image illustrated in FIG. 16 is obtained by superimposing and displaying a slider 451 on the image in the example illustrated in FIG. 15. This slider 451 is an operation icon, and the user can move the operating member 451a of the slider 451 to change the size of the mask.

More specific description will be given. When the user moves the operating member 451a upward in the example of the image, the arc portion 452a of the upper mask 452 is moved upward. (That is, the mask area of the upper mask 452 is reduced.) At the same time, the arc portion 453a of the lower mask 453 is moved downward. (That is, the mask area of the lower mask 453 is reduced.) When the user moves the operating member 451a downward in the example of the image, the arc portion 452a of the upper mask 452 is moved downward. (That is, the mask area of the upper mask 452 is increased.) At the same time, the arc portion 453a of the lower mask 453 is moved upward. (That is, the mask area of the lower mask 453 is increased.)

All these processing are carried out at Steps S135 and S140 in the above-mentioned reverse processing.

When the slider 451 is superimposed and displayed on an image, the user can change the size of a mask area by operating the operating member 451a and thus grasp to what extent the size of the mask can be changed when the user changes the size.

(11) Example with Various Operation Icons and the Like Displayed

Figure 17:
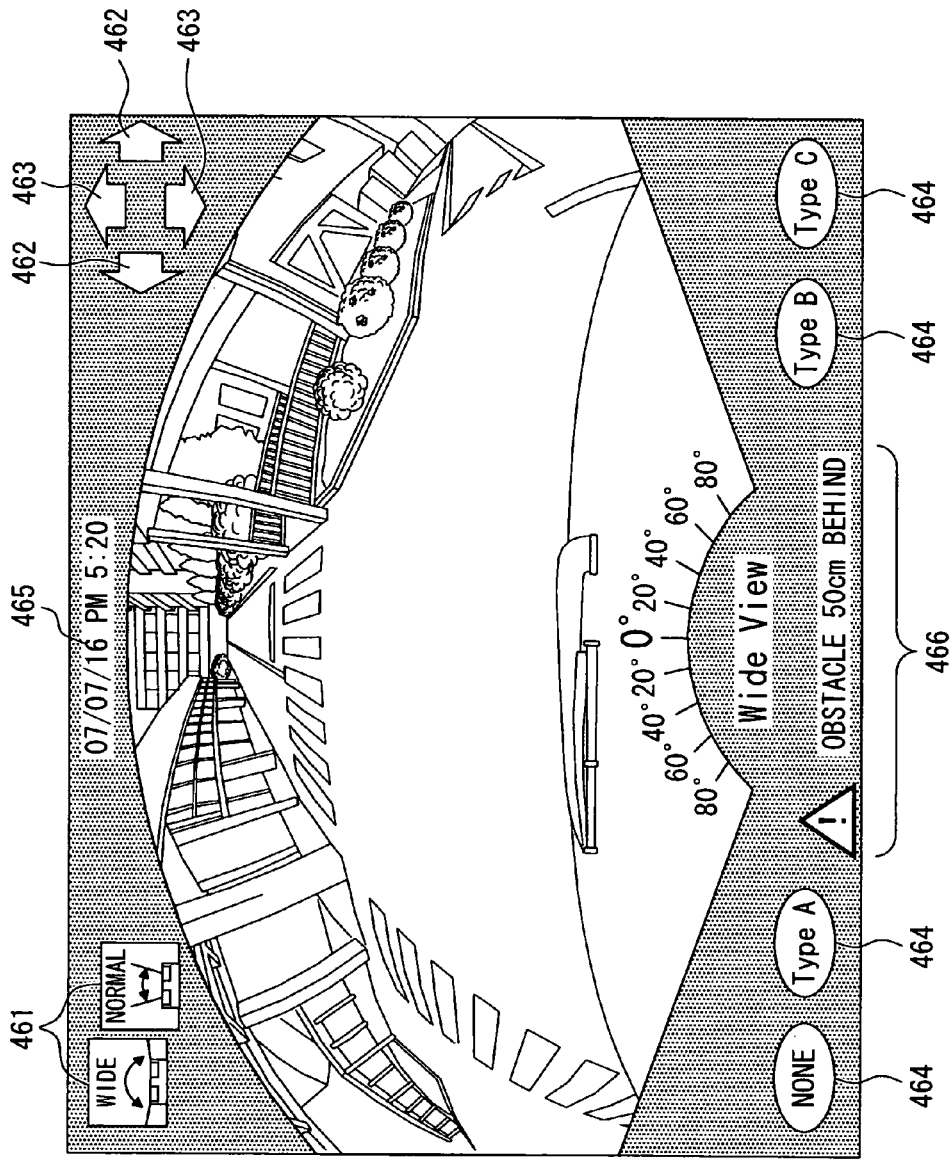
FIG. 17 illustrates an example in which various operation icons and the like are displayed in an example of an image.

The example of an image illustrated in FIG. 17 is obtained by superimposing and displaying operation icons and icons indicating reported information on the mask in the image in the example illustrated in FIG. 11. Specifically, the following operation icons are superimposed and displayed on a mask: view angle switching icons 461, mask type changing icons 462, mask size varying icons 463, and distortion correction selecting icons 464. As icons indicating reported information, a time information icon 465 and a warning icon 466 are superimposed and displayed on a mask.

When either of the view angle switching icons 461 is selected, the angle of view of the image displayed on the display device 22 is switched. Thus, the view angle switching icons 461 function as an example of an image switching means.

When either of the mask type changing icons 462, the type of the mask is changed.

When either of the mask size varying icons 463 is selected, the size of the mask area is varied. This brings the same effect as that of the above-mentioned slider operation.

When any one of the distortion correction selecting icons 464 is selected, the intensity of correction of distortion in an image displayed on the display device 22 is changed.

The time information icon 465 indicates the clock time.

The warning icon 466 is used to report reported information other than clock time and obstacle information. In the example illustrated in FIG. 17, it indicates the presence of an obstacle and the distance to the obstacle.

When icons are superimposed and displayed on a mask as mentioned above, a part of an image picked up by the camera 21 is not hidden by an icon. The user can carry out the operation of an operation icon or the like while viewing the icon and further get varied information.

(12) Examples of Images Switched and Displayed in Display Switching Processing

Figure 20A:
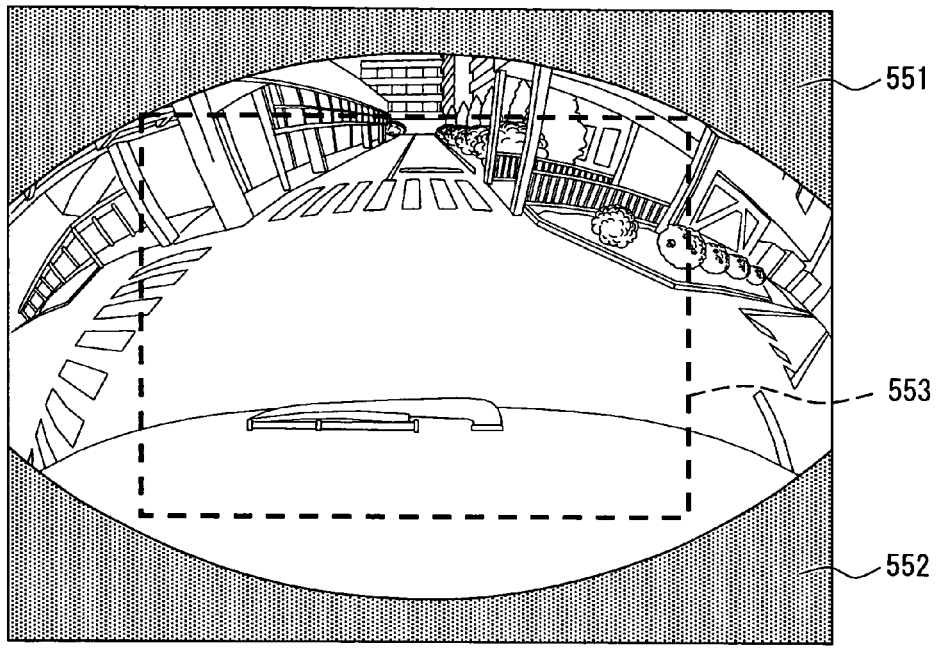
FIGS. 20A and 20B illustrate examples of images switched by display switching processing and displayed.
Figure 20B:
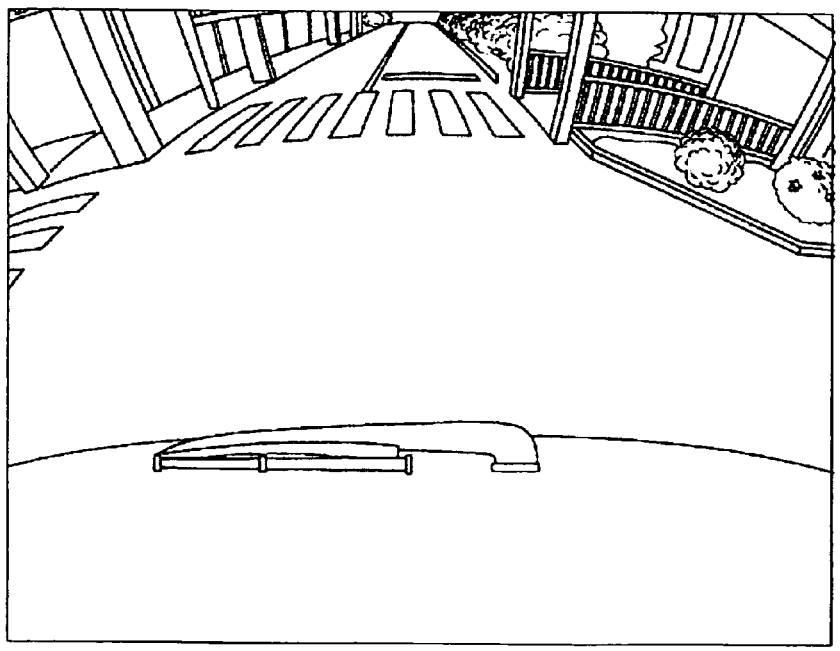

The examples of images illustrated in FIG. 20 are examples of a wide view angle image and a narrow view angle image switched by the display switching processing. FIG. 20A illustrates an example of a wide view angle image, which is the same as the example illustrated in FIG. 15. The area indicated by a boundary line 553 (not indicated in actual images) is an area of narrow view angle image described next. It is seen from the drawings that the area corresponding to the narrow view angle image indicated by the boundary line 553 and the masks 551, 552 do not overlap each other. FIG. 20B illustrates an example of narrow view angle image, which is obtained by trimming the area indicated by the boundary line 553 in FIG. 20A and zooming in it. Narrow view angle images are not combined with a mask. Thus, the display switching processing functions as an example of a narrow view angel image generating means.

When an image is switched to a narrow view angle image, as mentioned above, a mask is not combined and thus the amount of information obtained from the narrow view angle image can be increased. An area shown in a narrow view angle image is not masked when it is shown in a wide view angle image. Therefore, the visibility of an image is enhanced when the angle of view is changed.

Other Embodiments (1) An image may be masked only with an upper mask or a lower mask. That is, it is desirable that mask information pertaining to such a mask should be stored in the mask information storage unit 13 and the user can choose it.

To the contrary, it is also desirable that either of an upper mask and a lower mask configured by mask information can be erased as needed (an image can be left unmasked) according to the operation of the user.

With this construction, an image more suited to the user's taste can be displayed on the display device 22.

(2) The mask processing carried out by the image processor 11 in the above-mentioned embodiments is such that a portion to be masked is solidly shaded in a predetermined color. The following measures may be taken instead of solidly shading a portion to be masked: the brightness of a portion to be masked of an image is varied (for example, the brightness is reduced); the chroma of a portion to be masked of an image is varied (for example, the chroma is reduced); the hue of a portion to be masked of an image is changed (for example, the hue is changed to cold hue or monotone); or a portion to be masked of an image is gradated, opaqued, or mosaicked (i.e., reduced in image resolution). To make it possible to carry out these mask processing, needless to add, it is required to store appropriate mask information in the mask information storage unit 13 beforehand.

Even with such a mask processing method, the user can easily discriminate an image portion and a masked portion from each other. When these methods can be chosen, the display can be easily matched with the user's taste and the frequency of utilization of the image processor 11 is increased.

(3) The image processors 11 in the above embodiments are so constructed that the mask information storage unit 13 stores mask information by mask type and mask size and the image processing unit 18 utilizes mask information. Instead, the image processor of the invention may be so constructed that the following is implemented: mask information is stored in the mask information storage unit 13 only by mask type and the image processing unit 18 computes masks in various sizes based on the mask information to configure masks.

With this construction, the amount of data stored in the mask information storage unit 13 can be reduced.

(4) In the above embodiments, mask processing is carried out in the image processor 11. Instead, the following measure may be taken: mask processing is not carried out in the image processor 11 and the camera itself is provided with a mask. Description will be given to a camera lens provided with a mask with reference to the schematic diagram in FIG. 19.

Figure 19:
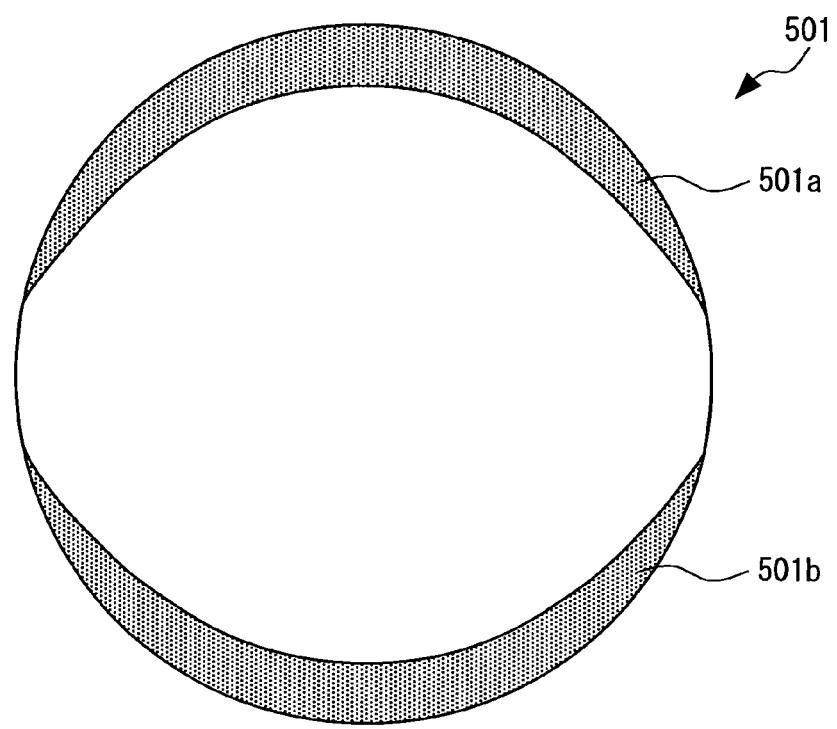
FIG. 19 illustrates an example of a masked lens.

As illustrated in FIG. 19, the lens surface of a camera lens 501 in a perfectly circular shape is provided with an upper mask member 501a and a lower mask member 501b. These mask members are formed of resin, metal, or the like and may be directly bonded to the lens surface of the camera lens 501 or may be detachably provided so that they cover the lens surface of the camera lens 501.

The upper mask member 501a is provided on the lens surface of the camera lens 501 so that it masks the upper part of an image when the image is displayed on the display device. A concrete example of an image displayed on the display device is the same as in FIG. 15. The lower mask member 501b is provided on the lens surface of the camera lens 501 so that it masks the lower part of an image when the image is displayed on the display device. A concrete example of an image displayed on the display device is the same as in FIG. 15.

With a camera lens having such mask members, the peripheral portion of an image that is prone to be distorted is masked and the driver' discomfort can be reduced.

In addition, an image with the much information of the central area of the image in the horizontal direction can be outputted. Therefore, this camera lens is suitable for processing images in which the information of the central area in the horizontal direction is especially important to a driver (for example, rear view images used when a vehicle is reversed.)

<Functions>

The image input interface 12 functions as an example of an image inputting means; the mask information storage unit 13 functions as an example of a mask information storing means; the image processing unit 18 functions as an example of a mask processing executing means or a person detecting means; the image output interface 15 functions as an example of an outputting means; the operation unit 16 functions as an example of an operation receiving means; and the information input interface 17 functions as an example of a reported information inputting means or an obstacle information inputting means.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, an image processor is provided by comprising the following: an image inputting means for inputting an image of the area adjacent to a vehicle from a camera mounted on the vehicle by an image signal; a mask information storing means for storing mask information that is information related to a mask; a mask processing executing means for carrying out mask processing on an image inputted by the image inputting means based on mask information stored in the mask information storing means; and an outputting means for outputting an image subjected to mask processing by the mask processing executing means to a display device. The shape of images outputted to the display device by the outputting means is substantially rectangular. The mask represented by mask information stored in the mask information storing means is composed of an upper mask and a lower mask. Of these masks, the upper mask is disposed along the upper side of an image when the image is displayed on the display device and is concave on the lower side. The lower mask is disposed along the lower side of an image when the image is displayed on the display device and is concave on the upper side. Herein, a mask may be defined as producing the effect that the masked portion of an image is less viewable than the unmasked portion.

With the above image processor, therefore, the peripheral portion of an image that is prone to be distorted is masked. As a result, it is possible to reduce a driver's discomfort and output an image with the much information of the central area of the image in the horizontal direction. That is, the image processor is suitable for processing images in which the information of the central area in the horizontal direction is especially important to a driver (for example, rear view images used when a vehicle is reversed, i.e., in backing operation).

As an optional aspect, the concave shape of at least either of the upper mask and the lower mask may be along the distorted curve of an image inputted by the image inputting means. The "distorted curve of an image inputted by the image inputting means" is a curve that indicates the degree of distortion in a camera image and is along a lattice in a camera image on the assumption that that lattice is a subject shot by a camera.

Figure 18A:
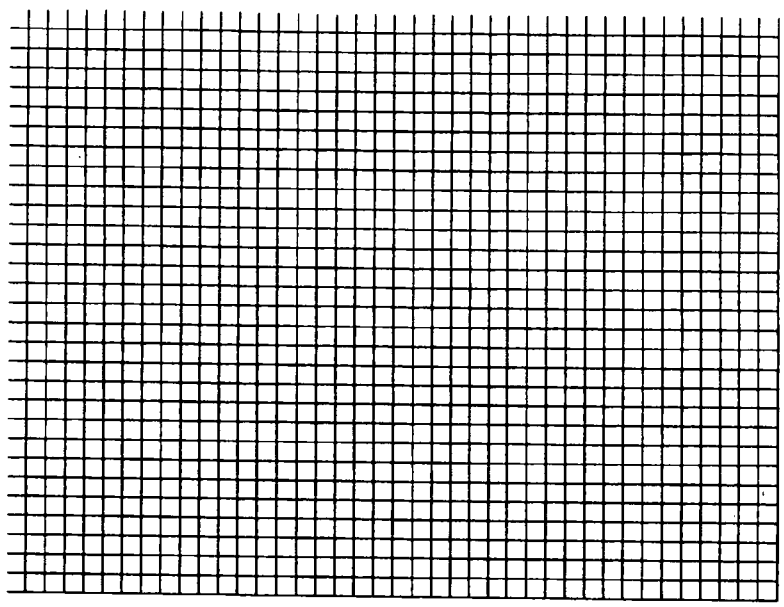
FIGS. 18A and 18B are explanatory drawings illustrating distorted curves of an image.
Figure 18B:
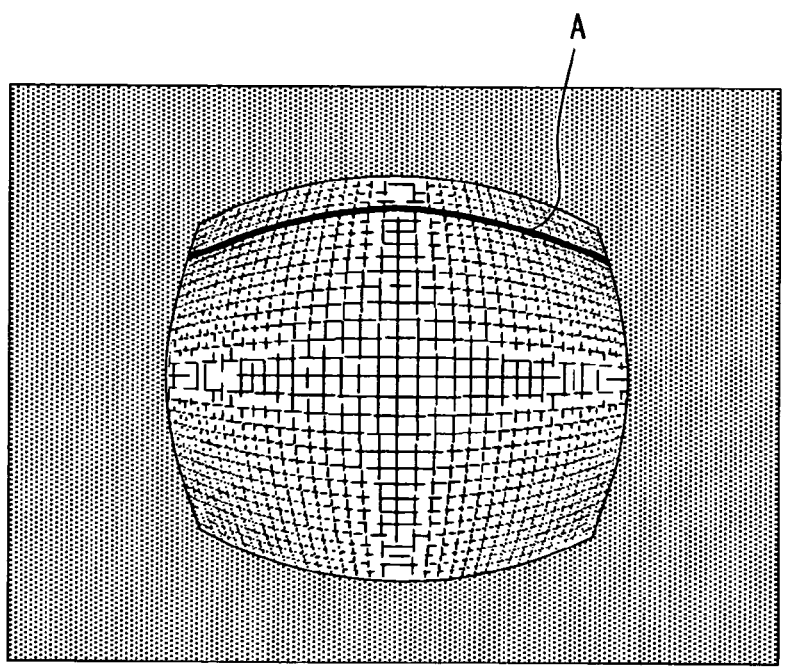

Description will be given to a concrete example of this curve with reference to an explanatory drawing in FIGS. 18A, 18B. When the lattice illustrated in FIG. 18A is shot by a camera equipped with a wide angle lens with an angle of view of 180 degrees or so, the image outputted from the camera is as illustrated in FIG. 18B. That is, the image is distorted at its peripheral portion. In this image, a line in the horizontal direction (for example, line A) is the above-mentioned distorted curve. Therefore, when scenery is shot by a camera equipped with a wide angle lens, the horizon is also distorted along distorted curves in an image. For this reason, when the concave shape of a mask is along a distorted curve, the user can grasp the concave-shaped portion as a reference line equivalent to the horizon. Therefore, the user can easily recognize the positional relation between objects in a distorted image.

As an optional aspect, the concave shape of at least either of the upper mask and the lower mask may be substantially V shape when the mask is rotated so that it is open on the upper side and viewed. With such a mask, an image can be made to appear to radiate and thus the user can easily get the feeling of spread.

As an optional aspect, the concave shape of the upper mask may be along a distorted curve of an image inputted by the image inputting means, and the concave shape of the lower mask may be substantially V shape. With such a mask, the user can naturally view an image and further obtain the feeling of spread.

As an optional aspect, the mask processing carried out by the mask processing executing means may be at least one of the following: solidly shading a portion to be masked; varying the brightness of a portion to be masked; varying the chroma of a portion to be masked, varying the hue of a portion to be masked; and gradating (or reducing resolution of) a portion to be masked. When this mask processing is carried out, the user can easily discriminate an image portion and a masked portion from each other.

As an optional aspect, mask information used in mask processing carried out by the mask processing executing means may be modifiable. That is, it is desirable that the following may be implemented: an operation receiving means for receiving a user's operation is provided; the image processor is so constructed that the mask information storing means stores mask information related to multiple masks; and the mask processing executing means carries out mask processing based on any one of the pieces of mask information stored in the mask information storing means, identified according to the operation received by the operation receiving means. With this construction, the user can choose a favorite mask. Herein, the mask information storing means may store mask information related to multiple masks, different in size, having the above-mentioned features. With this construction, the user can change multiple masks having the identical features and different in size in a phased (or step-by-step) manner.

As an optional aspect, the mask processing executing means may not carry out mask processing with respect to at least either of the upper mask and the lower mask according to the operation received by the operation receiving means. With this construction, the user can erase the upper mask or the lower mask from an image according to the situation or the taste of the user.

It is especially desirable that the operation receiving means may be a touch panel provided in the display surface of the display device to which the outputting means outputs images. With this construction, the user can view the display device and intuitively choose a mask.

When a user can choose a mask through the operation receiving means, it is especially desirable that the operation receiving means should be a steering wheel switch provided in the steering wheel of the vehicle. With this construction, the user can choose a mask without moving a hand of the user off the steering wheel while driving.

When a user can choose a mask, as mentioned above, it is desirable that the following should be implemented: the mask processing executing means superimposes an operation icon for guiding the user in operation on a masked portion of an image that underwent mask processing; and the outputting means outputs the image with the operation icon superimposed thereon to the display device. With this construction, a picked-up image portion of an image displayed on the display device is not hidden by the operation icon and the user can operate the operation icon while viewing the icon.

However, even though an operation icon is not superimposed on a picked-up image portion and is superimposed on a masked portion, the user can feel bothered in the following cases: cases where an operation icon is continuously displayed on the display device though the icon is not operated.

To cope with this, it is desirable that the following should be implemented: when the touch panel is touched, the mask processing executing means superimposes an operation icon and causes the operation icon to disappear when a predetermined time has passed thereafter. For the "predetermined time" cited here, a time substantially long enough to determine that the user does not have an intention to operate the icon is suitable and for example, a time of 10 seconds can be adopted for this purpose. The predetermine time can be adjusted by the user through the operation receiving means. With this construction, it is possible to display an operation icon in the display surface of the display device only when the icon is to be operated. When the operation icon is kept unoperated for the predetermined time after the operation is completed or is not carried out at all, the icon is caused to disappear. Therefore, the degree to which the user feels bothered can be reduced.

As an optional aspect, the image processor may further include a reported information inputting means for inputting reported information to be reported to the user. It is advisable that the following should be implemented: the mask processing executing means superimposes at least either of a character or a graphic based on reported information inputted by the reported information inputting means on a masked portion of an image that underwent mask processing; and the outputting means outputs the image with at least either of the character and the graphic superimposed thereon to the display device. Possible examples of reported information include time information, weather information, information on the state of the vehicle, and the like. With this construction, the picked-up image portion of an image displayed on the display device is not hidden by reported information and the user can recognize the reported information.

As an optional aspect, the image processor should further include an obstacle information inputting means for inputting obstacle information, which is information related to any obstacle present in the field of the camera. It is desirable that the following should be implemented: when obstacle information is inputted through the obstacle information inputting means, the mask processing executing means changes the color of a masked portion of an image that underwent mask processing to a predetermined color; and the outputting means outputs the image with the color of the masked portion changed to the predetermined color to the display device. With this construction, the user can immediately recognize that an obstacle is present in an image being displayed on the display device. Further, the user can be prevented from overlooking the obstacle.

Herein, when a distance from the vehicle to an obstacle is inputted as obstacle information, the mask processing executing means may change the color of a masked portion of an image that underwent mask processing according to the inputted distance. A possible example is as follows: when the distance to an obstacle is not less than 5 m, a masked portion is colored in black; when the distance to an obstacle is not less than 1 m and less than 5 m, a masked portion is colored in brown; and when the distance to an obstacle is less than 1 m, a masked portion is colored in red. With this construction, the user can grasp the approximate distance to an obstacle at a glance to the display device and easily carry out appropriate driving operation corresponding to the distance to the obstacle.

As an optional aspect, when the image processor includes the obstacle information inputting means for inputting obstacle information, the following may be implemented: when obstacle information is inputted through the obstacle information inputting means, the mask processing executing means may superimpose at least either of a character and a graphic based on the obstacle information on a masked portion of an image; and the outputting means may output the image with at least either of the character and the graphic superimposed thereon to the display device. The "character or graphic based on the obstacle information" cited here refers to, for example, a character or a graphic indicating the type of an obstacle, the distance to an obstacle or the like. With this construction, the user can obtain more detailed information (information difficult to understand only from an image) about an obstacle from a character or a graphic displayed on the display device. Therefore, the user can easily carry out appropriate driving operation or the like.

When a person is embraced in an image inputted by the image inputting means, the user is required to pay extra attention. Consequently, as an optional aspect, the following may be implemented: the image processor may further include a person detecting means for detecting any person in an image inputted by the image inputting means; when a person is detected by the person detecting means, the mask processing executing means may change the color of a masked portion of the image that underwent mask processing to a predetermined color; and the outputting means may output the image with the color of the masked portion changed to the predetermined color to the display device. With this construction, the user can learn that a person is present in the field of the camera when a masked portion is colored as predetermined. Therefore, the user can more easily recognize the presence of a person and pay attention to the person.

However, if a person is hidden by a mask, the above object will be spoiled. Consequently, the following may be implemented: the person detecting means may be also capable of detecting the position of a person in an image; the mask processing executing means may determine whether or not the person detected by the person detecting means will be hidden as the result of mask processing; and when it is determined that the person will be hidden, mask processing may not be carried out. With this construction, a person can be prevented from being hidden by a mask.

As an optional aspect, the image inputting means may use wire communication to input an image from the camera; however, it is desirable that the image inputting means should use wireless communication to input an image from the camera. With this construction, it is unnecessary to provide a signal wire between the camera and the image inputting means and thus the amount of work for installing the image processor can be reduced.

As an optional aspect, the camera from which the image inputting means inputs the above image may be a camera equipped with a wide view angle lens. In general, the wide view angle lens refers to a lens with an angle of view of substantially 180 degrees or above. In general, cameras equipped with a wide view angle lens have such a characteristic that the peripheral area of an output image is largely distorted. Therefore, each of the above image processors especially works when they are combined with a camera equipped with a wide view angle lens.

Since vehicles run on roads, users tend to want information in the horizontal direction rather than information in the vertical direction. Therefore, of wide view angle lenses, those with a horizontal angle of view of 180 degrees or above may allow each of the above-mentioned image processor to work.

When an image processor is combined with a camera equipped with a wide view angle lens, it is especially desirable that the image processor should be constructed as follows: the image processor is provided with a narrow view angle image generating means that clips or cuts out a central portion by trimming a portion away from a wide view angle image acquired from the camera by the image inputting means and generates a narrow view angle image as an zoomed-in image. Further, the image processor is provided with an image switching means that switches an image the outputting means should be caused to output between the following images: a wide view angle image acquired from the camera by the image inputting means and a narrow view angle image generated by the narrow view angle image generating means. The mask processing executing means carries out mask processing only when the image switching means has switched the image to a wide view angle image. The mask processing executing means thereby prevents the following from overlapping each other when it carries out mask processing: a masked portion of the above image subjected to mask processing and the portion of a wide view angle image corresponding to a narrow view angle image. This image processor makes it possible to increase the amount of information obtained from a narrow view angle image and further enhance the visibility of an image when the angle of view is changed.

As another aspect of the disclosure, a mask member may be provided in a camera itself instead of carrying out mask processing on the image processor side. That is, the lens portion of the camera can be provided with an upper mask member and a lower mask member. The upper mask member is used to mask the upper part of an image when the image is displayed on the display device and implements a mask concave on the lower side. The lower mask member is used to mask the lower part of an image when the image is displayed on the display device and implements a mask concave on the upper side.

With this camera, the peripheral portion of an image that is prone to be distorted is masked; therefore, it is possible to reduce a driver's discomfort and further output an image with the much information of the central area of the image in the horizontal direction. That is, the camera is suitable for processing images in which the information of the central area in the horizontal direction is especially important to a driver (for example, rear view images used when a vehicle is reversed).

It will be obvious to those skilled in the art that various changes may be made in the above-described embodiments of the present invention. However, the scope of the present invention should be determined by the following claims.

What is claimed is:

1. A vehicular image processor for a vehicle to carry out mask processing to an image of an area adjacent to a rear side of the vehicle from a rear-view camera of the vehicle, the image processor comprising:
   an image interface that receives a single image captured by the rear-view camera of the vehicle as an image signal, the single image including a rear-side-vehicle-body of the vehicle;
   a mask information storage unit; and
   an image processing unit cooperatively operable with the image interface and the mask information storage unit, the image processing unit being programmed to facilitate:
      reading a mask from the mask information storage unit,
      inputting the single image from the image interface, and
      carrying out mask processing on the single image onto which the mask read from the mask information storage unit is superimposed, to define an unmasked area of the single image, wherein:
         a shape of the single image is substantially rectangular having a left side, a right side, a top side, and a bottom side,
         the mask superimposed onto the single image includes simultaneously an upper mask along the top side of the single image and a lower mask along the bottom side of the single image,
         the upper mask and the lower mask being spaced apart in a top-bottom direction,
         the upper mask being concave on a lower side thereof,
         the lower mask having a first slope and a second slope on an upper side thereof, the first slope descending toward the second slope, the second slope descending toward the first slope,
         the lower mask being disposed on the single image to position the rear-side-vehicle-body to an area defined between the first slope and the second slope,
         each of the upper mask and the lower mask having a top-bottom width that is narrower as approaching from each of the left side and the right side toward a central part of the single image that masks a peripheral portion of the single image that is prone to be distorted,
         the unmasked area of the single image having a top-bottom width which is broader as approaching from each of the left side and the right side towards a central part,
         the rear-view camera includes a wide view angle lens having a horizontal angle of view of 180 degrees or more, and
         due to a distortion of the captured single image in the horizontal angle of view, the area of the single image captured by the rear-view camera between the first slope and the second slope displays the rear-side-vehicle-body of the vehicle with a horizontal angle of view that is reduced to less than 180 degrees.

2. The image processor according to claim 1, wherein a concave shape of the upper mask is along a distorted curve of the single image.

3. The image processor according to claim 1, wherein mask processing includes at least any one of: solidly shading a portion to be masked of the single image; varying a brightness of a portion to be masked of the single image; varying a chroma of a portion to be masked of the single image; varying a hue of a portion to be masked of the single image; and gradating a portion to be masked of the single image.

4. The image processor according to claim 1, wherein
   the mask information storage unit stores a plurality of masks including the lower mask having the first slope and the second slope,
   the image processing unit is configured to receive, from a user, an identification of one of the plurality of masks, and
   the image processing unit carries out the mask processing based on the identification from the user.

5. The image processor according to claim 4, wherein the plurality of masks stored in the mask information storage unit have different sizes.

6. The image processor according to claim 1, further comprising:
   an information input interface cooperatively operable with the image processing unit, to receive an operation by a user and provide the operation to the image processing unit, wherein
   the image processing unit cancels mask processing with respect to at least either of the upper mask and the lower mask according to the operation received by the information input interface.

7. The image processor according to claim 1, wherein:
   the image processing unit superimposes at least one switching icon in at least one of a left end portion and a right end portion within one of the upper mask and the lower mask, the at least one switching icon being used to switch the mask into a different mask shape or size.

8. The image processor according to claim 1, wherein:
   the image processing unit changes a color of the mask in response to detection of an obstacle in the single image captured by the rear-view camera of the vehicle to a predetermined color corresponding to a distance to the obstacle.

9. The image processor according to claim 1, wherein:
   the image processing unit cancels mask processing with respect to at least one of the upper mask and the lower mask in response to detection of a person hidden by the at least one of the upper mask and the lower mask in the single image captured by the rear-view camera of the vehicle.

10. A vehicular image processor for a vehicle to carry out mask processing to an image of an area adjacent to a rear side of the vehicle from a rear-view camera of the vehicle, the image processor comprising:
   an image interface that receives a single image captured by the rear-view camera of the vehicle as an image signal, the single image including a rear-side-vehicle-body of the vehicle;
   a mask information storage unit; and
   an image processing unit cooperatively operable with the image interface and the mask information storage unit, the image processing unit being programmed to facilitate:
      reading a mask from the mask information storage unit,
      inputting the single image from the image interface, carrying out mask processing on the single image onto which the mask read from the mask information storage unit is superimposed, to define an unmasked area of the single image, and superimposing an angle scale on a lower part of the single image, wherein:

a shape of the single image is substantially rectangular having a left side, a right side, a top side, and a bottom side, the mask superimposed onto the single image includes simultaneously an upper mask along the top side of the single image and a lower mask along the bottom side of the single image, the upper mask and the lower mask being spaced apart in a top-bottom direction, the upper mask being concave on a lower side thereof, the lower mask having a V-shaped recess on an upper side thereof, the lower mask being disposed on the single image to position the rear-side-vehicle-body and the angle scale to an area defined within the V-shaped recess, each of the upper mask and the lower mask having a top-bottom width that is narrower as approaching from each of the left side and the fight side toward a central part of the single image that masks a peripheral portion of the single image that is prone to be distorted, the unmasked area of the single image having a top-bottom width which is broader as approaching from each of the left side and the fight side towards a central part, the rear-view camera includes a wide view angle lens having a horizontal angle of view of 180 degrees or more, due to a distortion of the captured single image in the horizontal angle of view, the area of the single image captured by the rear-view camera within the V-shaped recess displays the rear-side-vehicle-body of the vehicle with a horizontal angle of view that is reduced to less than 180 degrees, and the angle scale positioned within the V-shaped recess displays angle values scaled to match the distortion of the captured single image in the reduced horizontal angle of view.

11. The image processor according to claim 10, wherein a concave shape of the upper mask is along a distorted curve of the single image.

12. The image processor according to claim 10, wherein mask processing includes at least any one of: solidly shading a portion to be masked of the single image; varying a brightness of a portion to be masked of the single image; varying a chroma of a portion to be masked of the single image; varying a hue of a portion to be masked of the single image; and gradating a portion to be masked of the single image.

13. The image processor according to claim 10, wherein the mask information storage unit stores a plurality of masks including the lower mask having the V-shaped recess, the image processing unit is configured to receive, from a user, an identification of one of the plurality of masks, and the image processing unit carries out the mask processing based on the identification from the user.

14. The image processor according to claim 13, wherein the plurality of masks stored in the mask information storage unit have different sizes.

15. The image processor according to claim 10, further comprising:

an information input interface cooperatively operable with the image processing unit, to receive an operation by a user and provide the operation to the image processing unit, wherein the image processing unit cancels mask processing with respect to at least either of the upper mask and the lower mask according to the operation received by the information input interface.

16. The image processor according to claim 10, wherein:

the image processing unit superimposes at least one switching icon in at least one of a left end portion and a right end portion within one of the upper mask and the lower mask, the at least one switching icon being used to switch the mask into a different mask shape or size.

17. The image processor according to claim 10, wherein:

the image processing unit changes a color of the mask in response to detection of an obstacle in the single image captured by the rear-view camera of the vehicle to a predetermined color corresponding to a distance to the obstacle.

18. The image processor according to claim 10, wherein:

the image processing unit cancels mask processing with respect to at least one of the upper mask and the lower mask in response to detection of a person hidden by the at least one of the upper mask and the lower mask in the single image captured by the rear-view camera of the vehicle.

19. A vehicular image processor for a vehicle to carry out mask processing to an image of an area adjacent to the rear side of a vehicle from a rear-view camera of the vehicle, the image processor comprising:

an image interface that receives a single image captured by the rear-view camera of the vehicle as an image signal, the single image including a rear-side-vehicle-body of the vehicle;

a mask information storage unit; and an image processing unit cooperatively operable with the image interface and the mask information storage unit, the image processing unit being programmed to facilitate:

reading a mask from the mask information storage unit, inputting the single image from the image interface, and carrying out mask processing on the single image onto which the mask read from the mask information storage unit is superimposed, to define an unmasked area of the single image, wherein:

a shape of the single image is substantially rectangular having a left side, a right side, a top side, and a bottom side, the mask superimposed onto the single image includes simultaneously an upper mask along the top side of the single image and a lower mask along the bottom side of the single image, the upper mask and the lower mask being spaced apart in a top-bottom direction, the upper mask being concave on a lower side thereof, the lower mask having a V-shaped recess on an upper side thereof, the lower mask being disposed on the single image to position the rear-side-vehicle-body to an area defined within the V-shaped recess, the lower mask also displaying a model of a rear part of the vehicle, each of the upper mask and the lower mask having a top-bottom width that is narrower as approaching from each of the left side and the right side toward a central part of the single image that masks a peripheral portion of the single image that is prone to be distorted, the unmasked area of the single image having a top-bottom width which is broader as approaching from each of the left side and the right side towards a central part, the rear-view camera includes a wide view angle lens having a horizontal angle of view of 180 degrees or more, and due to a distortion of the captured single image in the horizontal angle of view, the area of the single image captured by the rear-view camera within the V-shaped recess displays the rear-side-vehicle-body of the vehicle with a horizontal angle of view that is reduced to less than 180 degrees.

20. The image processor according to claim 19, wherein a concave shape of the upper mask is along a distorted curve of the single image.

21. The image processor according to claim 19, wherein mask processing includes at least any one of: solidly shading a portion to be masked of the single image; varying a brightness of a portion to be masked of the single image; varying a chroma of a portion to be masked of the single image; varying a hue of a portion to be masked of the single image; and gradating a portion to be masked of the single image.

22. The image processor according to claim 19, wherein
the mask information storage unit stores a plurality of masks including the lower mask having the V-shaped recess,
the image processing unit is configured to receive, from a user, an identification of one of the plurality of masks, and
the image processing unit carries out the mask processing based on the identification from the user.

23. The image processor according to claim 22, wherein the plurality of masks stored in the mask information storage unit have different sizes.

24. The image processor according to claim 19, further comprising:
an information input interface cooperatively operable with the image processing unit, to receive an operation by a user and provide the operation to the image processing unit, wherein
the image processing unit cancels mask processing with respect to at least either of the upper mask and the lower mask according to the operation received by the information input interface.

25. The image processor according to claim 19, wherein:
the image processing unit superimposes at least one switching icon in at least one of a left end portion and a right end portion within one of the upper mask and the lower mask, the at least one switching icon being used to switch the mask into a different mask shape or size.

26. The image processor according to claim 19, wherein:
the image processing unit changes a color of the mask in response to detection of an obstacle in the single image captured by the rear-view camera of the vehicle to a predetermined color corresponding to a distance to the obstacle.

27. The image processor according to claim 19, wherein:
the image processing unit cancels mask processing with respect to at least one of the upper mask and the lower mask in response to detection of a person hidden by the at least one of the upper mask and the lower mask in the single image captured by the rear-view camera of the vehicle.

28. A vehicular image processor for a vehicle to carry out mask processing to an image of an area adjacent to a rear side of the vehicle from a rear-view camera of the vehicle, the image processor comprising:
an image interface that receives a single image captured by the rear-view camera of the vehicle as an image signal, the single image including a rear-side-vehicle-body of the vehicle;
a mask information storage unit; and
an image processing unit cooperatively operable with the image interface and the mask information storage unit, the image processing unit being programmed to facilitate:
reading a mask from the mask information storage unit,
inputting the single image from the image interface, and
carrying out mask processing on the single image onto which the mask read from the mask information storage unit is superimposed, to define an unmasked area of the single image, wherein:
a shape of the single image is substantially rectangular having a left side, a right side, a top side, and a bottom side,
the mask superimposed onto the single image includes simultaneously an upper mask along the top side of the single image and a lower mask along the bottom side of the single image,
the upper mask and the lower mask being spaced apart in a top-bottom direction,
the upper mask being concave on a lower side thereof,
the lower mask having a first slope, a second slope, and a semi-circle portion on an upper side thereof, the first slope descending toward the second slope, the second slope descending toward the first slope, the semi-circle portion being disposed between the first slope and the second slope and having an angle scale,
the lower mask being disposed on the single image to position the rear-side-vehicle-body to an area between the first slope and the second slope,
each of the upper mask and the lower mask having a top-bottom width that is narrower as approaching from each of the left side and the right side toward a central part of the single image that masks a peripheral portion of the single image that is prone to be distorted,
the unmasked area of the single image having a top-bottom width which is broader as approaching from each of the left side and the right side towards a central part,
the rear-view camera includes a wide view angle lens having a horizontal angle of view of 180 degrees or more,
due to a distortion of the captured single image in the horizontal angle of view, the area of the single image captured by the rear-view camera between the first slope and the second slope displays the rear-side-vehicle-body of the vehicle with a horizontal angle of view that is reduced to less than 180 degrees, and
the angle scale attached to the semi-circle portion displays angle values to match with the distortion of the captured image in the reduced horizontal angle of view.

29. The image processor according to claim 28, wherein a concave shape of the upper mask is along a distorted curve of the single image.

30. The image processor according to claim 28, wherein mask processing includes at least any one of: solidly shading a portion to be masked of the single image; varying a brightness of a portion to be masked of the single image; varying a chroma of a portion to be masked of the single image; varying a hue of a portion to be masked of the single image; and gradating a portion to be masked of the single image.

31. The image processor according to claim 28, wherein
the mask information storage unit stores a plurality of masks including the lower mask having the first slope, the second slope, and the semi-circle portion,
the image processing unit is configured to receive, from a user, an identification of one of the plurality of masks, and
the image processing unit carries out the mask processing based on the identification from the user.

32. The image processor according to claim 31, wherein the plurality of masks stored in the mask information storage unit have different sizes.

33. The image processor according to claim 28, further comprising:
an information input interface cooperatively operable with the image processing unit, to receive an operation by a user and provide the operation to the image processing unit, wherein
the image processing unit cancels mask processing with respect to at least either of the upper mask and the lower mask according to the operation received by the information input interface.

34. The image processor according to claim 28, wherein:

the image processing unit superimposes at least one switching icon in at least one of a left end portion and a right end portion within one of the upper mask and the lower mask, the at least one switching icon being used to switch the mask into a different mask shape or size.

35. The image processor according to claim 28, wherein:

the image processing unit changes a color of the mask in response to detection of an obstacle in the single image captured by the rear-view camera of the vehicle to a predetermined color corresponding to a distance to the obstacle.

36. The image processor according to claim 28, wherein:

the image processing unit cancels mask processing with respect to at least one of the upper mask and the lower mask in response to detection of a person hidden by the at least one of the upper mask and the lower mask in the single image captured by the rear-view camera of the vehicle.

* * * * *